(12) United States Patent
Park et al.

(10) Patent No.: US 7,606,557 B2
(45) Date of Patent: *Oct. 20, 2009

(54) MOBILE COMMUNICATION TERMINAL HAVING A FUNCTION OF READING OUT INFORMATION FROM CONTACTLESS TYPE COMMUNICATION TAG AND METHOD FOR PROVIDING INFORMATION OF WHETHER AN ARTICLE IS GENUINE OR NOT

(75) Inventors: Mi Kyoung Park, Rm. 303, Seogeon Art Villa, 1608-2, Seocho-dong, Seocho-gu, Seoul (KR) 137-070; Kwang Chul Hyun, Seoul (KR)

(73) Assignee: Mi Kyoung Park, Seoul (KR)

( * ) Notice: Subject to any disclaimer, the term of this patent is extended or adjusted under 35 U.S.C. 154(b) by 210 days.

This patent is subject to a terminal disclaimer.

(21) Appl. No.: 10/551,344

(22) PCT Filed: Mar. 31, 2004

(86) PCT No.: PCT/KR2004/000739

§ 371 (c)(1),
(2), (4) Date: Aug. 18, 2006

(87) PCT Pub. No.: WO2004/089017

PCT Pub. Date: Oct. 14, 2004

(65) Prior Publication Data

US 2007/0176744 A1    Aug. 2, 2007

(30) Foreign Application Priority Data

| Apr. 1, 2003 | (KR) | ................... 10-2003-0020603 |
| May 1, 2003 | (KR) | ................... 10-2003-0027995 |
| Jun. 4, 2003 | (KR) | ................... 10-2003-0036113 |

(51) Int. Cl.
*H04M 1/66* (2006.01)

(52) U.S. Cl. ............... 455/410; 455/41.2; 340/572.1; 380/247; 380/277

(58) Field of Classification Search ............... 455/410, 455/41.2; 340/572.1; 380/247, 277
See application file for complete search history.

(56) References Cited

U.S. PATENT DOCUMENTS 6,226,619 B1    5/2001    Halperin et al.

(Continued)

FOREIGN PATENT DOCUMENTS

DE    43 41 880 A1    12/1993

(Continued)

OTHER PUBLICATIONS

K. Finkenzeller, "RFID Handbuch: Grundlagen und praktische Anwendungen induktiver Funkanlagen, Transponder under kontaktloser Chipkarten", 2002, in German, pp. 225-231, 281-317 and 336-339.

(Continued)

*Primary Examiner*—Nghi H Ly
(74) *Attorney, Agent, or Firm*—Stites & Harnison, PLLC; Juan Carlos A. Marquez, Esq.

(57) ABSTRACT

Provided are a mobile communication terminal having a tag read function and a method of providing genuine product authentication service. The mobile communication terminal having the tag read function specifies an encryption key corresponding to an encryption key stored in the tag from its own plurality of encryption keys based on a signal received from the tag. The mobile communication terminal receives an encrypted product code or product information from the tag and decrypts the received product code or product code using an encryption key. Also, the mobile communication terminal outputs a result of decryption on a liquid crystal display (LCD) window or as beep sounds or voices.

16 Claims, 9 Drawing Sheets

U.S. PATENT DOCUMENTS

| | | | |
|---|---|---|---|
| 7,274,909 B2 * | 9/2007 | Perttila et al. | 455/41.2 |
| 7,340,214 B1 * | 3/2008 | Hamberg | 455/41.2 |
| 2002/0067267 A1 | 6/2002 | Kirkham | |
| 2007/0109124 A1 * | 5/2007 | Park et al. | 340/572.1 |

FOREIGN PATENT DOCUMENTS

| | | |
|---|---|---|
| DE | 199 20 744 A1 | 5/1999 |
| JP | 2000-148950 | 11/1998 |
| JP | 2000-251164 | 3/1999 |
| JP | 2000-348148 | 6/1999 |
| JP | 2001-341810 | 6/2000 |
| JP | 2001-354310 | 6/2000 |
| JP | 2002-104617 | 9/2000 |
| JP | 2002-209692 | 1/2001 |
| JP | 2002-215749 | 1/2001 |
| JP | 2003-69549 | 8/2001 |
| KR | 1020010050145 A | 8/2000 |
| KR | 1020010089216 A | 3/2001 |
| KR | 1020020085144 A | 5/2001 |
| KR | 20-0252202 | 7/2001 |
| KR | 1020030089045 A | 5/2002 |
| WO | WO 01/99331 A1 | 6/2001 |

OTHER PUBLICATIONS

International Search Report for Application Serial No. PCT/KR2004/000739 dated Jun. 26, 2004.

Japanese Office Action dated May 7, 2008 for Japanese Application No. 2006-507788 in Japanese.

* cited by examiner

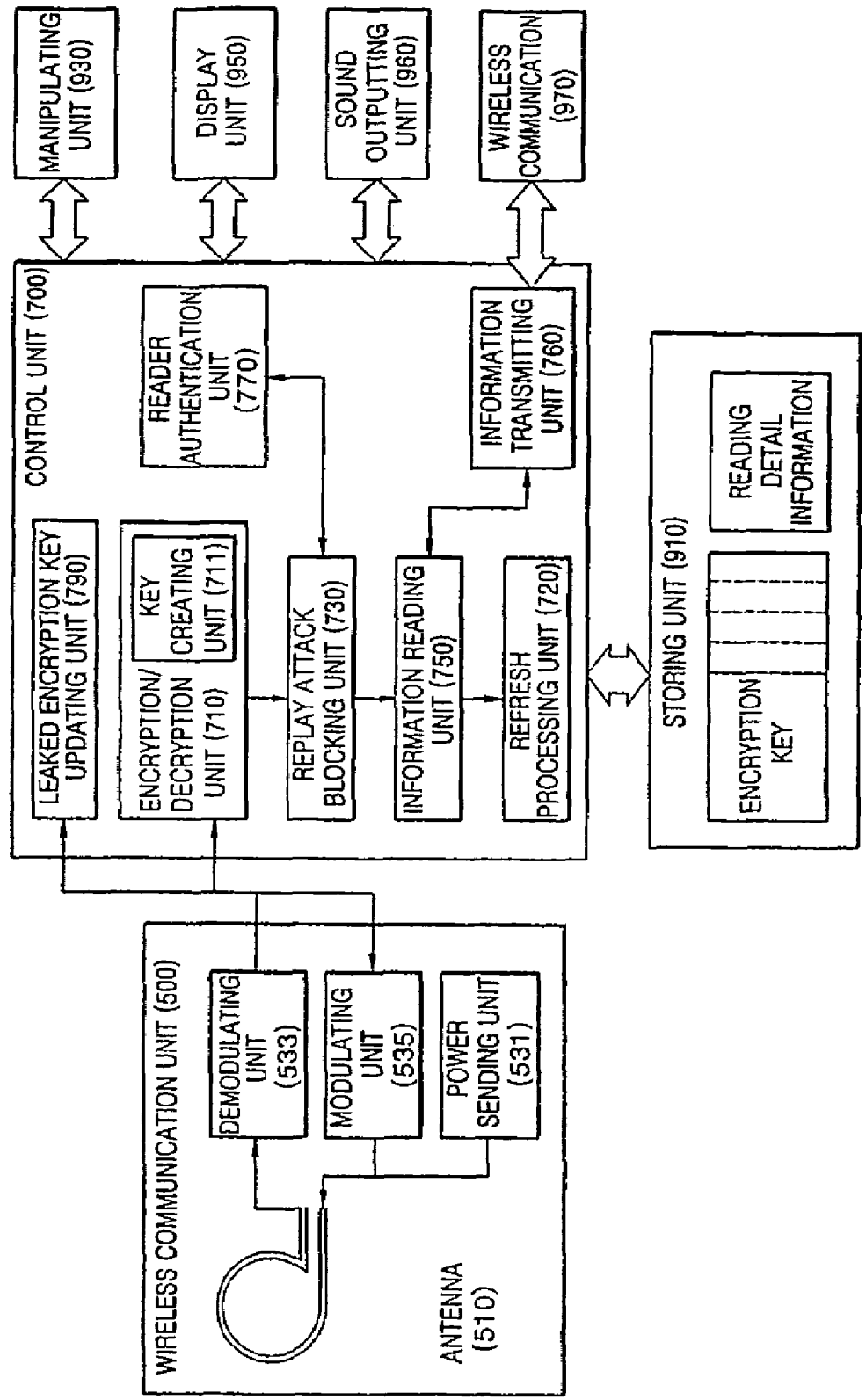

MOBILE COMMUNICATION TERMINAL HAVING A FUNCTION OF READING OUT INFORMATION FROM CONTACTLESS TYPE COMMUNICATION TAG AND METHOD FOR PROVIDING INFORMATION OF WHETHER AN ARTICLE IS GENUINE OR NOT

BACKGROUND OF THE INVENTION

1. Field of the Invention

The present invention relates to a mobile communication terminal having a tag read function and a method of providing genuine product authentication service, and more particularly, to a mobile communication terminal that makes it possible to determine the genuineness of a product by reading out and displaying information of a tag that is attached to products of various brands and provides information about the product, and a method of providing genuine product authentication service, in which information about the genuineness of a product is provided to a user by decrypting information stored in a tag and outputting the decrypted information.

2. Description of the Related Art

Japanese Laid-open Patent Publication Nos. Hei 14-215749 and Hei 14-209692 disclose techniques for identifying product information and carrying out purchasing and goods management by using a tag that has electrically recorded thereon the product information and conducts communication in a contactless manner and a portable tag reader that reads out information recorded in the tag. However, since these techniques do not concern determination of the genuineness of a product, recording or reading of information is very vulnerable and there is a possibility of counterfeiting the information or manipulating recording of the information.

As another conventional approach, Korean Patent Publication No. 2002-85144 and Japanese Laid-open Patent Publication Nos. Hei 13-354310 and Hei 13-341810 disclose network-type genuineness determining systems that read out product information electrically recorded on a contactless communication tag, refers to a product management database via a communication network like the Internet, and determines the genuineness of a corresponding product. However, to use the network-type systems, a tag reader should be manufactured in the form of a desktop, in the case of exchanging data with the product management database via wired communication network. As a result, to determine the genuineness of a product, a visit to a specified place should be made. Also, in the case of exchanging data with the product management database via wireless communication network, as the size of a tag reader increases, the tag reader becomes unhandy to carry, a cost price of the tag reader increases, and a charge is imposed on the use of a wireless communication network every time the tag reader is used. Moreover, in the case of the tag reader manufactured in the form of a desktop, since the genuineness of a product is only determined in a specified place, the genuineness of the product cannot be determined prior to purchasing.

As another conventional approach, Japanese Laid-open Patent Publication Nos. Hei 12-348148 and Hei 12-148950 disclose techniques in which a tag reader determines the genuineness of a product by reading out product information electrically recorded on a contactless communication tag and comparing the read information with reference data (a product number, a date of manufacture, a product manufacture brand name, management history information, a product description) that is previously stored therein. However, such an offline-type authentication device solves the problem of the network-type systems, but memory capacity increases because the tag reader should previously store all the product information for every product. Also, since the tag reader itself determines the genuineness of a product and provides only a result of the self determination, a user cannot directly check information of an authentication procedure and reliability of the authentication procedure is low. In other words, this conventional tag reader only considers a position of product distributors, but does not meet the needs of product purchasers. Also, this conventional tag reader has problems that new products that are distributed after purchasing of the tag reader or products of newly joined companies cannot be the subject of genuineness determination or product information of already distributed tag readers should be updated. Also, the above conventional approaches do not consider a case where the tag is detached from the product and attached to a counterfeit product.

To solve such problems, Korean Patent Publication No. 2001-89216, Korean Utility Model Registration No. 252202, and Japanese Laid-open Patent Publication No. Hei 12-251164 disclose genuineness determining devices that include a contactless communication tag in which product information attached to a product is stored and a tag reader. The genuineness determining devices prevent the reuse of a tag by destroying an antenna if the tag is detached from the product. However, application of these conventional genuineness determining devices is limited to special products such as bottling products and a proactive measure may be taken to prevent physical destroy of the tag. Also, since the tag itself is destroyed, even manufacturers cannot read tag reading history information to use the tag reading history information for customer-oriented marketing.

SUMMARY OF THE INVENTION

The present invention provides a mobile communication terminal that makes it possible to determine the genuineness of a product by decrypting information received from a contactless communication tag and outputting the decrypted information.

The present invention also provides a method of providing genuine product authentication service in which information about the genuineness of a product is provided to a user by decrypting information stored in a tag and outputting the decrypted information.

According to one aspect of the present invention, there is provided a mobile communication terminal that receives information received from a contactless communication tag. The mobile communication terminal includes a first communication unit, which wirelessly exchanges data with the contactless communication tag and wirelessly sends a power required for the contactless communication tag, a second communication unit, which transmits data to and receives data from a service management server via a wireless communication network, a storing unit in which at least one encryption key related information are stored, a decryption unit, which decrypts data received from the contactless communication tag based on encryption key related information that is selected from the encryption key related information by encryption key specifying information received from the contactless communication tag, an information reading unit, which requests product information to the contactless communication tag attached to a product and reads the product information received from the contactless communication tag, and an output unit, which outputs the read product information.

According to another aspect of the present invention, there is provided a method of managing product authentication service in a product authentication service management server that communicates with a subscriber server of a mobile communication company via a network and can communicate with a mobile communication terminal via a mobile communication network. The method involves receiving reading detail information including a product identification number assigned to each product whose tag is to be read and a reader identification number assigned to the mobile communication terminal from the mobile communication terminal, asking the subscriber server inquiry of subscriber information based on an identification number of the mobile communication terminal included in the reading detail information and receiving the subscriber information from the subscriber server, creating and storing customer management information including subscriber classification information and product information reading details based on the reading detail information and the subscriber information, and reading and outputting the customer management information in response to an information output request that is input from an external device.

BRIEF DESCRIPTION OF THE DRAWINGS

The above and other features and advantages of the present invention will become more apparent by describing in detail exemplary embodiments thereof with reference to the attached drawings in which:

FIG. 3 is a schematic block diagram of a configuration of a mobile communication terminal according to the present invention;

DETAILED DESCRIPTION OF THE INVENTION

Hereinafter, preferred embodiments of a mobile communication terminal having a tag read function and a method of providing genuine product authentication service according to the present invention will be described in detail with reference to the attached drawings.

Figure 1:
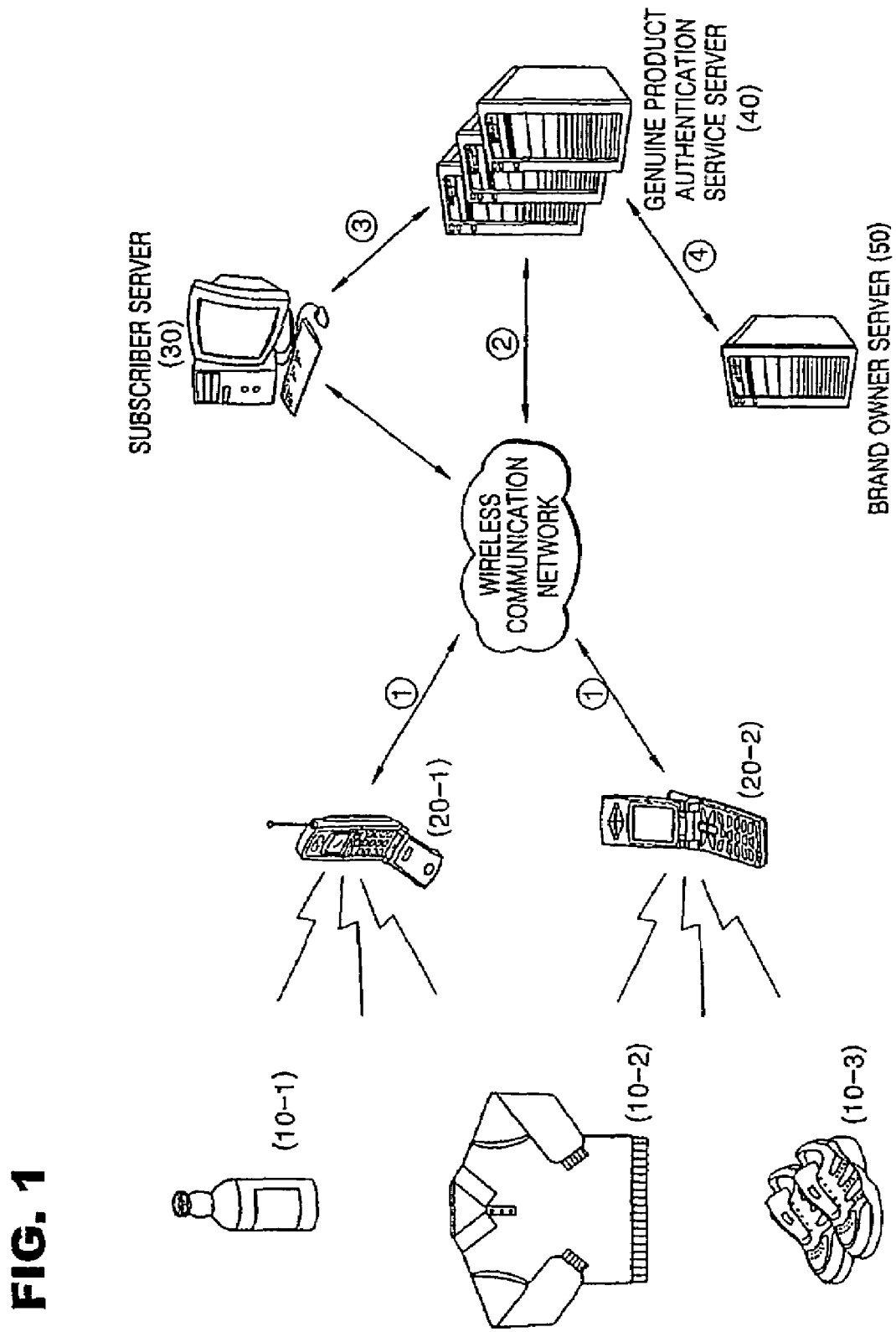
FIG. 1 is a view for explaining a genuine product authentication system according to the present invention.

FIG. 1 is a view for explaining operations according to the present invention.

Referring to FIG. 1, mobile communication terminals having a tag read function 20-1 and 20-2 according to the present invention read information of contactless communication tags 10-1, 10-2, and 10-3 and display the read information. The contactless communication tags 10-1, 10-2, and 10-3 are attached to various products such as clothing, footwear, leather products, liquor, agriculture products & livestock goods, drugs & medications, electronics, machinery, jewellery, art works, appraisal reports, admission tickets, certificates and tickets for the use of facilities, money, marketable securities, and important documents.

The contactless communication tags 10-1, 10-2, and 10-3 are square-shaped and thin film-type passive tags, each of which has a width and a length of 10-18 mm.

Tag readers are provided with being built in the mobile communication terminals 20-1 and 20-2. Individuals having the mobile communication terminals 20-1 and 20-2 can determine the genuineness of a brand based on product information displayed on a display unit of the mobile communication terminals 20-1 and 20-2 by approaching their mobile communication terminals 20-1 and 20-2 to products. In other words, when an individual approaches his mobile communication terminal to the tag of a foreign liquor, if the foreign liquor is genuine, a genuine product code '7' is displayed on the display unit of the mobile communication terminal. Also, when an individual approaches his mobile communication terminal to the tag of a leather purse, if the leather purse is a counterfeit product, a counterfeit warning message (e.g., "Error" or a predetermined certain sound) is output instead of the genuine product code '9'. On the other hand, a sound such as a beep sound or a voice message can be output according to a result of reading. For example, if an illegible tag is detected, the mobile communication terminal repetitively outputs a short pulse tone a number of times. If a product code is successfully read, the mobile communication terminal outputs a short reading sound while displaying the read product code in an output unit. Also, the mobile communication terminal may output the read product code mixed with a voice. If the product code is limited to a number, the amount of such voice data is not large and can be stored in memory having a low capacity. Further, a color can be used as the product code. In this case, a color code that only should be marked in a genuine product is printed in the tag-attached product. The tag reader reads the color code from the tag and displays a result of reading by combining on/off of a plurality of light emitting diodes (LED) having, for example, R, G, Y, and B colors according to the read color code. In case of detecting presence of an illegible tag, the mobile communication terminal can express a counterfeit tag or a bad tag by outputting an error message using a predetermined color pattern.

Also, product codes are sequentially displayed on the display unit of the mobile communication terminal a plurality number of times by one-time reading of the mobile communication terminal. The product codes sequentially displayed on the display unit of the mobile communication terminal correspond to product information including at least one of a manufacturer, a type of industry, a brand, and a product name. Tables that product information corresponding to each of product tags is written to are provided to tag-attached products. If the tag reader is put to a tag, a plurality of product codes is sequentially displayed in order of tables. For example, a mobile communication terminal having a tag read function is approached to foreign liquor having a tag attached thereto according to the present invention, a first displayed product code '7501' can recognize that this product is of a type of liquor based on items of a product type table that is the first table. Next, data '0014' that is displayed at predetermined time intervals can recognize that a brand name of this product is 'Valentine' based on items of a brand name table that is another table printed in the product. Next, data '0017' displayed at predetermined time intervals can recognize that this product is 'Aged 17 years' based on items of an aging year table that is yet another table printed in the product.

The mobile communication terminals 20-1 and 20-2 according to the present invention can transmit information reading details read from the tag to a genuine product authentication service management server 40 (hereinafter, referred to as a service management server 40) via a mobile communication network. The information reading details include a product identification number assigned to each product whose tag is to be read and a reader identification number assigned to each of the mobile communication terminals 20-1 and 20-2. The information reading details also include genuine product authentication detail information such as a type of industry, a manufacturer, a brand, a product name, a grade, a model name, a producing center, a date of manufacture, a serial number, a price, and a date of authentication. Also, the information reading details may include purchasing information about products that has been sold among products whose genuineness is authenticated. The purchasing information may include a purchasing price and date and time of purchasing in addition to the genuine product authentication detail information.

Upon receipt of the reading detail information from the mobile communication terminals 20-1 and 20-2 (steps ①and ②), the service management server 40 can obtain personal information of a corresponding subscriber by referring identification information of the mobile communication terminals 20-1 and 20-2 included in the received reading detail information to a subscriber server 30 of a mobile communication company (step ③). By using such a function of the service management server 40, distributors can perform more refined customer management. In other words, detailed personal information such as sex distinction, age, address, scholarly attainments, job, and hobby of a subscriber are stored in the subscriber server 30 by a mobile communication company. The service management server 40 can analyze a propensity of purchasing of persons in a specific age, a propensity of purchasing of persons having a specific job, or preference of products by gathering the received reading detail information and these subscriber information. These information can be used as marketing information for manufacturers that produce products whose genuineness is to be authenticated. The service management server 40 stores the gathered information as customer management information and makes a report and outputs the report in response to a request from manufacturers that produce product whose genuineness is to be authenticated or from authentication service management companies. Alternatively, the service management server 40 occasionally makes the report and transmits the report to a brand owner server 50 that can communicate via a network (step ④). Such a technique for making a marketing report is well known in this field and will not described in detail.

Such information gathering can be regularly or irregularly performed manually by manipulation of users after completion of purchasing or genuine product authentication. By installing a specific application program in a mobile communication terminal, such an upload process may be performed while users cannot notice such an upload process. The specific application program monitors the amount of accumulated information and a communication state, a specific data channel is assigned to the specific application program during voice communication or data communication, and the specific application program transmits accumulated reading detail information. Also, the specific application program monitors the amount of accumulated information, and if the amount of accumulated information reaches a predetermined amount, the specific application program transmits the accumulated information in the form of a plaintext to a service server.

The service management server 40 may further include point information as the customer management information. In other words, the service management companies save up points as incentives for a subscriber that assists in gathering purchasing information. As the points are accumulated, the service management companies provide a product to the subscriber or allow the subscriber to use saved points for product purchasing or contents in affiliated companies by making the points into electronic money. Such saving up of points is carried out by processing saving up for a corresponding subscriber according to a kind and contents of reading detail information received by the service management server 40. For example, the points may be saved up differently according to a price of a product that has been purchased or according to a manufacturer or a product name.

Also, the service management server 40 can additionally check if received product reading detail information is retransmitted detail information by checking if a product information identification number and a reader identification number that are included in the reading detail information are the same as previously received product reading detail information. In other words, to prevent a customer from attempting to accumulate points by repetitively transmitting purchasing detail information, the service management server 40 authenticates purchasing detail information transmitted in the form of a full text. The mobile communication terminals 20-1 and 20-2 transmit an identification number of a tag reader and an identification number of a read tag when transmitting purchasing detail information. The service management server 40 blocks repetitive reflection of the same purchasing detail information into accumulation of points by ignoring purchasing detail information in which the identification number of the tag reader is the same as that of the tag.

Figure 2:
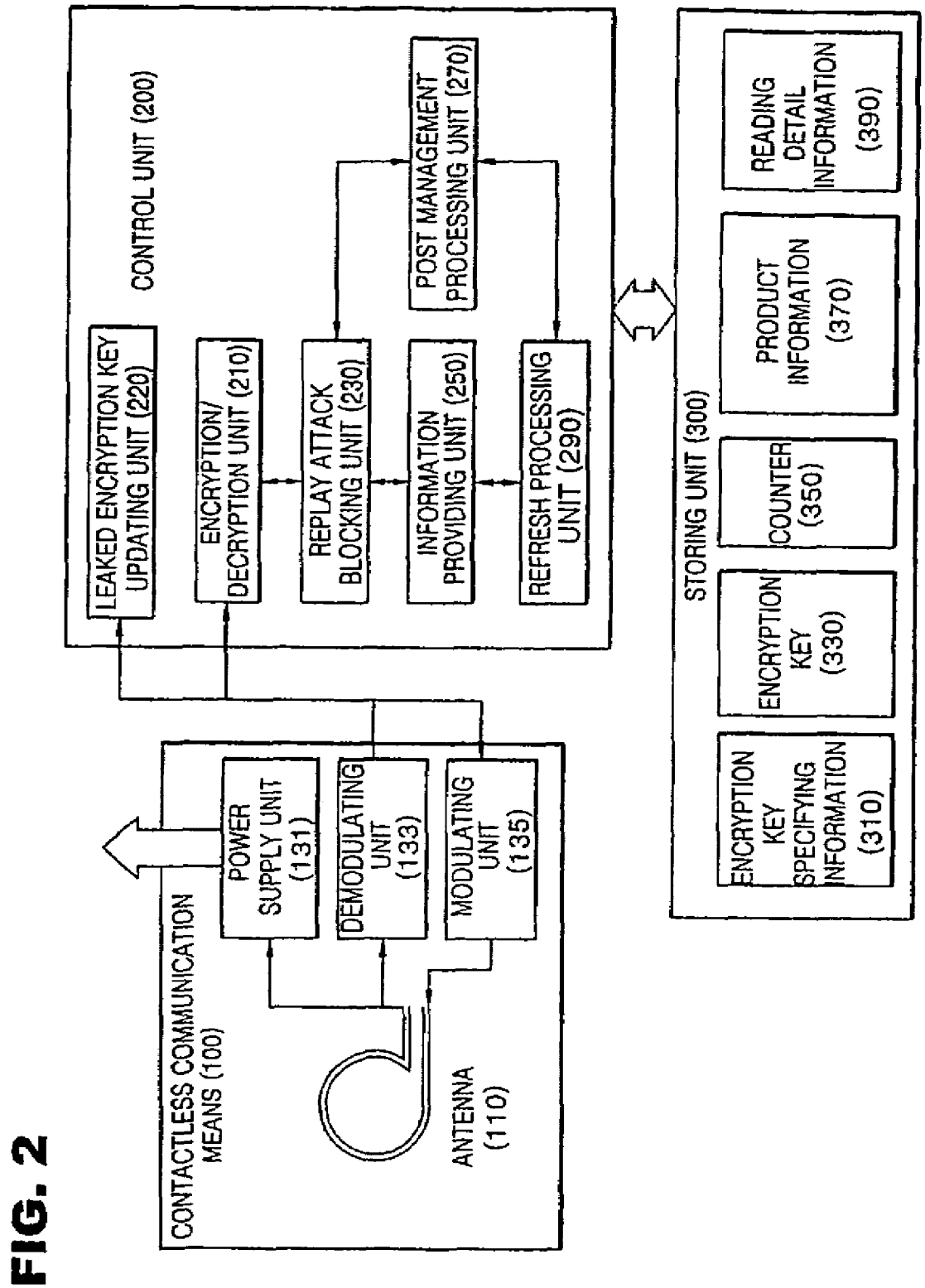
FIG. 2 illustrates a configuration of a contactless communication tag according to the present invention.

FIG. 2 illustrates a configuration of a contactless communication tag according to the present invention. In the following description, the concept of a tag reader includes the mobile communication terminal having the tag read function.

Referring to FIG. 2, a contactless communication tag 10 according to a preferred embodiment of the present invention includes a contactless communication means 100, a control unit 200, and a storing unit 300.

The contactless communication means 100 exchanges data in a wireless manner with a tag reader 20, extracts power components from received radio signals, and supplies the extracted power components as a power source of the-entire system. The control unit 200 encrypts product information stored in the storing unit 300 into an encryption key and outputs the encryption key to external devices through the contactless communication means 100. The product information and encryption key information are stored in the storing unit 300.

The contactless communication means 100 includes an antenna 110, a power supply unit 131, a demodulating unit 133, and a modulating unit 135. The antenna 110 transmits information to and receives information from the tag reader 20 in a wireless manner. The power supply unit 131 supplies power sources to the contactless communication tag 10 by processing power electric wave signals among signals received through the antenna 100. The demodulating unit 133 demodulates signals received from the tag reader 20. The modulating unit 135 modulates signals to be transmitted to the tag reader 20. The antenna 110 is a printed pattern or a coil and is formed along the circumference of a tag. Since the configurations of the modulating unit 135 and the demodulating unit 133 are well known to those skilled in the art and will not be described in detail. Since the contactless communication tag 10 according to the present invention should be manufactured to be small-sized and thin, it is desirable to manufacture the contactless communication tag 10 as a passive type. Thus, the power supply unit 131 extracts power components from radio signals received from the tag reader 20 and supplies the extracted power components as a power source of the entire system. The operation and configuration of the power supply unit 131 are well known and will not be described in detail.

The storing unit 300 includes a nonvolatile semiconductor memory like electrical erasable programmable read-only memory (EEPROM) or flash ROM and data is preserved during loss of power. The storing unit 300 may physically include two memories, i.e., a read-only memory and a write/read memory. However, in a preferred embodiment of the present invention, the storing unit 300 includes a single writable/readable nonvolatile memory. Product information 370 about a tag-attached product such as a type of industry, a manufacturer, a brand, a product name, a grade, a model name, a producing center, a date of manufacture, a date of delivery, and a serial number is stored in data stored in the storing unit 300. Also, the storing unit 300 stores an encryption key 330 required for encryption of communication between the contactless communication tag 10 and the tag reader 20. Also, the storing unit 300 stores encryption key specifying information 310 required for specifying the encryption key 330 at the tag reader side. Further, the storing unit 300 includes a counter area for storing the number of times the product information 370 of the contactless communication tag 10 is read by the tag reader 20. The storing unit 300 may store information about the tag reader 20 that performs a read operation and reading detail information like date and time of reading.

The product information 370 stored in the storing unit 300 may be in the form of a product code made up of a combination of numbers, a combination of colors, or a combination of letters. A product code made up of a combination of numbers is output on the display unit of the tag reader 20. Also, the product code may be made up of binary codes and/or color codes sequentially arranged. Only a single product code may be stored in the storing unit 300, but a plurality of product codes may be stored in the storing unit 300 and be sequentially read and displayed. At this time, the product code may be previously determined according to a manufacturer, a brand, a type of industry, and a product name. Thus, an individual having a code table can obtain product information such as a manufacturer, a brand, a type of industry, and a product name through product codes sequentially displayed.

The control unit 200 that controls the entire system of the contactless communication tag 10 according to the present invention is implemented as hardware only for digital logic designed as a state machine, e.g., an application specific integrated circuit (ASIC) designed based on flip-flops and gates. Such a circuit can be easily achieved by those skilled in the art who are supported by commonly used various computeraided design (CAD) tools and will not be described in detail. Thus, since an additionally stored main program is not used, it is possible to avoid a problem involving a term of preservation in a nonvolatile memory. However, in this case, product information or encryption key related information that may vary according to tags is also stored in a nonvolatile memory as data. Countermeasures for limitation of the term of preservation will be described later. However, the present invention is not limited to hardware only for digital logic, but the control unit 200 may be implemented as a microprocessor.

Also, the characteristic functions of the present invention can be achieved by control by software. At this time, a main program is additionally stored in the storing unit 300. In another embodiment of the present invention, the storing unit 300 physically includes two memories and a portion including the main program may be stored in a separate memory.

The control unit 200 includes an encryption/decryption unit 210, an information providing unit 250, a replay attack blocking unit 230, and a post management processing unit 270. Each of these components may be separated from the control unit 200, and the replay attack blocking unit 230 and the post management processing unit 270 are selectively included in the control unit 200. The encryption/decryption unit 210 decrypts signals received through the contactless communication means 100 or encrypts signals to be transmitted and outputs encrypted signals to the contactless communication means 100.

The information providing unit 250 reads the product information 370 stored in the storing unit 300 and provides the read product information 370 to the encryption/decryption unit 210. Also, the information providing unit 250 reads the product information 370 stored in the storing unit 300 and outputs the read product information 370 through the contactless communication means 100, in response to a read command from the tag reader 20. The information providing unit 250 increases a counter value of the storing unit 300 by 1 whenever the product information 370 is read and checks the counter value stored in the storing unit 300 before the product information 370 is read. If the counter value is more than a predetermined value, the information providing unit 250 does not respond to the read command from the tag reader 20 or outputs, instead of the product information 370, a message indicating an inappropriate tag that is read an excessive number of times. However, in this case, internally, the counter value is continuously increased and recorded. The counter value can be checked by a specific reader carried by a manager.

Through such management of the number of times a tag is read, it is possible to effectively prevent a tag from being reused by detaching the tag from a genuine product and attaching the detached tag to a counterfeit product or separating a disused tag from a used genuine product and attaching the detached tag to a counterfeit product. Also, by storing the counter value in an externally inaccessible area and checking the stored counter value, it is possible to effectively prevent reuse of a tag without additional cost in comparison to a physical measure. If a tag is attached to a product using a physically strong adhesive, it is possible to adopt a physical blocking method such as destroying a pattern-printed antenna when the tag is detached from the product. However, this method makes it impossible to perform post management of tag information or access the tag for use of the tag. Also, this method cannot initially prevent attempts to carefully detach a tag from a product. Also, there is a difficulty in mass production.

As a product placed on a display stand is read by tag readers a number of times, when determination of the genuineness of the product is actually needed, it may be impossible to read a tag attached to the product. To solve such a problem, it is desirable to put a cover film on the exposed surface of the tag to block reading of the tag at the time of delivery. The cover film may be, for example, an aluminum thin film that blocks wireless communication by covering the external surface of the tag. The cover film is detached from the tag when determination of the genuineness is needed.

A number-of-reading restriction reference value of a counter can be set differently according to products. For example, in the case of foods such as foreign liquor and agriculture products & livestock goods, it is preferable that the number-of-reading restriction reference value of the counter be limited to 3-5 times by considering that the tag may be read once at the time of delivery and twice—four times at the time of use. In the case of clothing, since genuine product authentication may be performed a number of times at the time of sale and after purchasing, the number-of-reading restriction reference value of the counter is preferably limited to several tens of times. In this way, the number-of-reading restriction reference value can be appropriately set according to the characteristics of a product or the number of steps of a distribution channel. However, the present invention is not limited to an embodiment where the counter value of the counter is checked to restrict reading and, for example, the number of times of reading may not be restricted with respect to a tag attached to famous pictures, antiques, or documents. In this case, the information providing unit 250 reads the product information 370 stored in the storing unit 300 and outputs the read product information 370 through the contactless communication means 100, in response to the reading command from the tag reader 20 and increases the counter value of the storing unit 300 whenever the production information 370 is read. However, in this case, the information providing unit 250 does not restrict providing of information based on the counter value.

In an embodiment where the product information 370 is sequentially displayed using a product code, the information providing unit 250 may provide a plurality of product codes at a time to the tag reader 20 or sequentially provide each of the plurality of product codes a number of times according to a request from the tag reader 20. When the information providing unit 250 sequentially provides the product codes a number of times, measures for encryption/decryption and replay attack prevention are applied to each data.

The encryption/decryption unit 210 encrypts information to be transmitted through the contactless communication means 100 and decrypts information received from the contactless communication means 100. A 3-data encryption standard (DES) algorithm is used as an encryption algorithm, but the encryption algorithm is not limited to the 3-DES algorithm. The 3-DES algorithm triply applies a DES and takes various forms. In this embodiment, a cascaded 3-DES is adopted in which three keys are sequentially used. Since these algorithms are all symmetric key algorithms, the same encryption key is used for encryption and decryption.

According to conventional genuineness product authentication methods, genuineness product authentication includes storing an inherent authentication code in a tag and determining whether the inherent authentication code is a code corresponding to a genuine product by reading the inherent authentication code from the reader. On the other hand, according to the present invention, genuine product authentication depends on human judgment on information displayed on the display unit of the reader and an encryption/decryption procedure that should be undergone to correctly display product information.

In a first embodiment of the contactless communication tag 10 according to the present invention, product information is encrypted and decrypted by a unique master key. In this case, a master key 330 that is a common unique key for all kinds of products is stored in the storing unit 300 of the contactless communication tag 10. The tag reader 20 also has a single unique key, but it is possible to read product information of all kinds of products. The encryption/decryption unit 210 encrypts information transmitted to external devices by the information providing unit 250 using the master key 330 as an encryption key, interprets an encrypted message received from an external device, and provides the interpreted message to the information providing unit 250. Since products can be identified by product information that is displayed on the tag reader 20 by the operation of the encryption/decryption unit 210, it is possible to provide genuineness information of numerous products. Further, if a tag that can be applied to a new product is newly incorporated, information of the tag can be read without a need to upgrade an existing tag reader.

In a second embodiment of the contactless communication tag 10 according to the present invention, a master key 330 as a single encryption key and the encryption key specifying information 310 for the master key 330 are stored in the storing unit 300 of the contactless communication tag 10. Companies using the contactless communication tag 10 prepare for a plurality of encryption keys that is differently assigned according to a type of industry and/or a manufacturer and/or a brand and/or a type of products. For example, in the case of major bands, it may be determined to use different encryption keys according to a type of products of the same brand. In the case of companies that produce a small number of products, a single encryption key may be designated for the companies. All the encryption keys required for reading tags of corresponding products are included in the tag reader 20.

Upon receipt of a request for product information from the tag reader 20, the encryption/decryption unit 210 transmits the encryption key specifying information 310 to the tag reader 20 and causes the tag reader 20 to select the same encryption key as the encryption key 330 stored in the tag reader 20. The encryption key specifying information 310 may be, for example, indices assigned to a plurality of encryption keys. Thereafter, the encryption/decryption unit 210 encrypts information that is to be transmitted to an external device by the information providing unit 250 using this encryption key, interprets an encrypted message received from the external device, and provides the interpreted message to the information providing unit 250.

As such, by using the encryption key specifying information 310, although some encryption keys are leaked out, damage is limited to a corresponding type of industry, a corresponding manufacturer, a corresponding brand, or a corresponding product. Also, in the same way as the embodiment where the unique master key is used, the same encryption key is included without a need to upgrade an existing distributed tag reader. However, it is also possible to additionally incorporate new tags storing new product information. Also, if a sufficient number of encryption keys are secured in a tag reader, it is possible to incorporate new products with a higher degree of security by assigning spare encryption keys. In other words, when a new tag is manufactured, by storing one of encryption keys secured as spare encryption keys and an index corresponding to the encryption key, the tag reader receives the index and can specify one of the encryption keys, which are secured as spare encryption keys, as an encryption key for the new tag.

In a third embodiment of the contactless communication tag 10 according to the present invention, at least two encryption keys 330 that are separated and assigned based on at least two references among a kind of industry, a manufacturer, a brand, and a brand name and the encryption key specifying information 310 corresponding to the encryption keys 330 are stored in the storing unit 300 of the contactless communication tag 10.

Figure 4A:
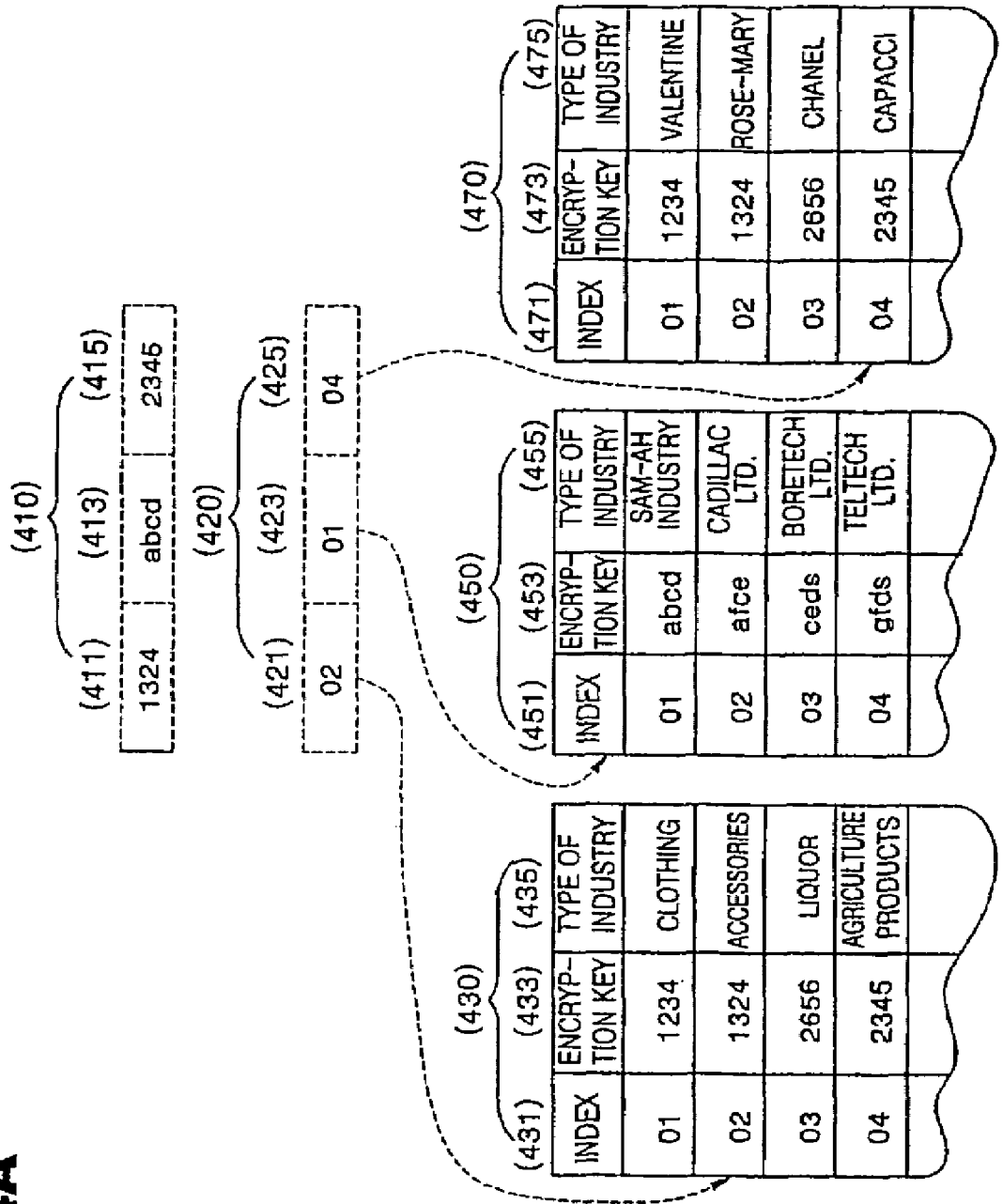
FIG. 4A illustrates exemplary encryption keys according to a third embodiment of an encryption/decryption unit 210.

FIG. 4A illustrates an exemplary encryption key 410 and exemplary encryption key specifying information 420 according to the third embodiment of the contactless communication tag 10 according to the present invention. Referring to FIG. 4A, the encryption key 410 stored in the contactless communication tag 10 includes three encryption keys 411, 413, and 415, each of which is determined according to a type of industry, a manufacturer, and a brand. All the encryption keys 433, 453, and 473 and indices 431, 451, and 471 as encryption key specifying information corresponding to the encryption keys 433, 453, and 473 are stored in the tag reader 20. The encryption keys of the tag reader 20 are classified into three groups, each of which is an encryption key assigned table for a type of industry, a manufacturer, and a brand. For example, the plurality of encryption keys 411, 413, and 415 may be three encryption keys used in each step of the 3-DES algorithm.

Upon receipt of a request for product information from the tag reader 20, the encryption/decryption unit 210 of the contactless communication tag 10 transmits indices as the encryption key specifying information 310, i.e., 02, 01, and 04, to the tag reader 20. The tag reader 20 looks up corresponding encryption key tables from the indices and selects the same encryption key set as the encryption key 410 stored in the contactless communication tag 10, i.e., 1324, abcd, and 2345, as encryption keys for reading the current contactless communication tag 10. Thereafter, the encryption/decryption unit 210 of the contactless communication tag 10 encrypts and decrypts information transmitted to and received from the tag reader by sequentially using the plurality of encryption keys.

Once the encryption keys are specified, the tag reader 20 can recognize a type of industry, a manufacturer, a brand, or a product name to which the encryption keys belong. In other words, in FIG. 4A, the tag reader 20 can recognize from received encryption key indices 421, 423, and 425 that a product to which the tag 10 is attached is included in a type of accessories, a manufacturer of the product is 'Sam-ah industry, and a brand name of the product is 'CAPACCI'. Thus, the product information 370 stored in the storing unit 300 and the encryption key specifying information 310 may partially overlap with each other in practice. In other words, the indices 421, 423, and 425 themselves may be parts of product information. The third embodiment has advantages of both the first embodiment and the second embodiment and can enhance the degree of security by sequentially using the plurality of encryption keys and sufficiently secure a margin for incorporation of new products.

In a fourth embodiment of the contactless communication tag 10 according to the present invention, the plurality of encryption keys 330 and the encryption key specifying information 310 are stored in the contactless communication tag 10 and the tag reader 20 includes encryption keys required for reading product information of all the corresponding products. In this embodiment, upon receipt of a request of reading from the tag reader 20, the contactless communication tag 10 selects one of the plurality of encryption keys 330, transmits encryption key specifying information corresponding to the selected encryption key to the tag reader 20, and makes mutual encryption keys identical to each other. Selection of an encryption key of the contactless communication tag 10 is performed using a rotary scheme or a random scheme. Thereafter, the contactless communication tag 10 encrypts and decrypts information exchanged with the tag reader 20 using the selected encryption key. The fourth embodiment of the contactless communication tag 10 according to the present invention has advantages of both the first embodiment. Since the contactless communication tag 10 responds by changing its encryption key in every read operation, the second embodiment can improve an ability to cope with a counterfeit reader.

In a fifth embodiment of the contactless communication tag 10 according to the present invention, the plurality of encryption key sets 330 and encryption key specifying information sets 310 are stored in the contactless communication tag 10, and the tag reader 20 includes encryption keys to read product information of all the corresponding products. Each of the encryption key sets of the contactless communication tag 10 includes at lest two encryption keys that are classified and assigned according to at least two references among a type of industry, a manufacturer, a brand, and a product name. For example, the plurality of encryption keys may be three encryption keys used for each step of the 3-DES algorithm. In other words, in the fifth embodiment of the present invention, the contactless communication tag 10 includes a plurality of sets of the encryption keys 411, 413, and 415 shown in FIG. 4A and a plurality of sets of the encryption key specifying information 421, 423, and 425. The encryption/decryption unit 210 sequentially uses the plurality of encryption keys and processes encryption and decryption. Selection of the encryption key of the tag is performed using a rotary scheme or a random scheme. Thereafter, the tag sequentially encrypts and decrypts information exchanged with the tag reader using the selected encryption key sets. In the similar way to the third embodiment of the contactless communication tag 10, in the fifth embodiment, once the encryption key is specified, the tag reader 20 can recognize a type of industry, a manufacturer, a brand, or a product name. Thus, in a varied form of the fifth embodiment, the product information 370 and the encryption key specifying information 310 of the storing unit 300 may partially overlap with each other. The fifth embodiment of the contactless communication tag 10 according to the present invention has advantages of both the first embodiments through the fourth embodiments.

In a sixth embodiment of the contactless communication tag 10 according to the present invention, one encryption key and encryption key creation information used for the reader to create the same encryption key as that of the contactless communication tag 10 are included in the contactless communication tag 10. Companies using the contactless communication tag 10 prepare for a plurality of encryption keys and assigns the encryption keys differently according to, for example, a type of industry and/or a manufacturer and/or a brand and/or a type of products. The tag reader 20 includes an encryption key creation module that can create all the encryption keys necessary to reading of a tag of a corresponding product. The encryption key creation module creates an encryption key using one seed value or a plurality of seed values and encryption key creation information received from the tag. The number of encryption keys that can be created by the tag reader 20 using one seed value may vary according to a parameter value of a function. Although a limited number of seed values are stored in the tag reader 20, it is possible to designate different encryption keys to numerous brands without a need to upgrade the tag reader 20. Thus, the genuine product authentication system according to the present invention can incorporate a number of new types of industry, manufacturers, brands, or types of products without a need to upgrade the tag reader 20 even after the tag reader 20 is distributed. Such incorporation is made possible by assigning a new encryption key to a corresponding product and attaching a tag storing creation information for creation of this new encryption key to the corresponding product. Also, in the genuine product authentication system according to the present invention, since product information is displayed on the display unit as sentences, it is possible to perform genuine product authentication with respect to various kinds of products using the same encryption key.

The encryption key creation module may create, for example, a result of involving a seed value by an integral value as received encryption key creation information. However, the present invention is not limited to this encryption key creation information, but the encryption key creation information should be understood to include information for specifying and creating an encryption key in the tag reader 20. For example, the encryption key creation information may be a successive code sequence including a manufacturer code, a brand code, and a product code or text information including a manufacturer name, a brand name, and a product name. Also, the encryption key creation algorithm includes numerous functions and operations that can create an encryption key using a seed value and at least one parameter. Thus, by appropriately selecting a creation algorithm of the encryption key creation module, it is possible to actually secure numerous encryption keys even when one seed value is stored in the tag reader 20.

Also, in the sixth embodiment of the contactless communication tag 10 according to the present invention, upon receipt of a request for product information from the tag reader 20, the encryption/decryption unit 210 of the contactless communication tag 10 transmits encryption key creation information as the encryption key specifying information 310 to the tag reader 20 to cause the tag reader 20 to create the same encryption key as the encryption key 330 stored in the tag reader 20. Thereafter, the encryption/decryption unit 210 encrypts information to be transmitted to external devices by the information providing unit 250 using this encryption key or interprets the encrypted message received from the external devices and then outputs the interpreted message to the information providing unit 250. In the sixth embodiment of the contactless communication tag 10, sufficiently numerous encryption keys are assigned for a type of industry, a manufacturer, a brand, or a product by more sufficiently securing the encryption key. Thus, even when encryption keys are partially leaked out, damage can be reduced to the minimum. Also, similarly with the first embodiment, it is possible to additionally incorporate new tags that have the same encryption key but store new product information, without a need to upgrade an existing distributed tag reader. Also, in this embodiment, when a new product is desired to be incorporated, if a tag stores a new encryption key and encryption key creation information used for creation of the encryption key, the tag reader can create the same encryption key as that of a corresponding tag using a stored seed value and the encryption key specifying information received from the tag. Thus, it is possible to incorporate more new products in the subject of genuine product authentication while maintaining higher security degree.

In a seventh embodiment of the contactless communication tag 10 according to the present invention, the storing unit 300 of the contactless communication tag 10 stores at least two encryption keys 330 that are classified and assigned according to at least two references among a type of industry, a manufacturer, a brand, and a product name and encryption key creation information as the encryption specifying information 310 corresponding to the at least two encryption keys 330. In this embodiment, the encryption/decryption unit 210 encrypts a message by sequentially using the stored encryption keys. The tag reader 20 receives the encryption key creation information from the contactless communication tag 10 and creates the same encryption key set as that stored in the contactless communication tag 10 through a specific function or an operation based on the received encryption key creation information or an internal seed value. The seventh embodiment has an advantage of enhancing security through multiple encryptions using a plurality of encryption keys, in comparison to the sixth embodiment.

In an eighth embodiment of the contactless communication tag 10, the storing unit of the contactless communication tag 10 stores at least two encryption keys 330, which are classified and assigned according to at least two references among a type of industry, a manufacturer, a brand, and a product name, encryption key creation information corresponding to the at least two encryption keys 330, and indices as identification information for specifying the encryption key creation information. In this embodiment, the encryption/decryption unit 210 performs multiple encryptions on a message by sequentially using the stored encryption keys. The tag reader 20 receives indices about encryption key creation information from the contactless communication tag 10 and creates the same encryption key set as that stored in the contactless communication tag 10 through a specific function or an operation based on the received indices and an internal seed value.

Figure 4B:
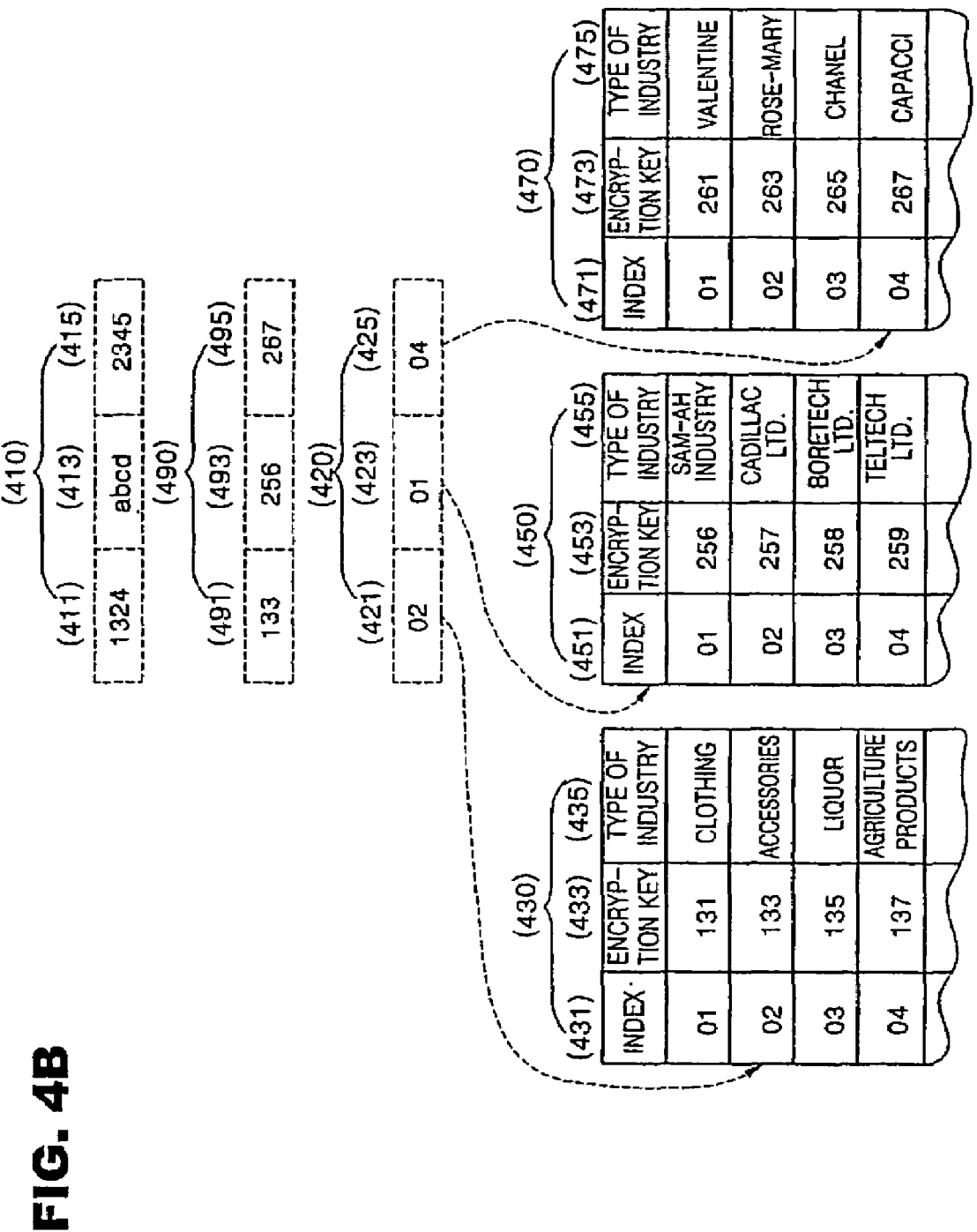
FIG. 4B illustrates exemplary encryption keys according to an eighth embodiment of the encryption/decryption unit 210.

FIG. 4B illustrates an encryption key 410, encryption key creation information 420, and an index corresponding to the encryption key creation information 420 according to the eighth embodiment of the contactless communication tag 10. In FIG. 4B, a configuration that corresponds to or the same as FIG. 4A refers to the same reference numeral. Referring to FIG. 4B, the encryption key 410 stored in the contactless communication tag 10 includes three encryption keys 411, 413, and 415, each of which is determined according to a type of industry, a manufacturer, and a brand. For example, this plurality of encryption keys 411, 413, and 415 may be three encryption keys used in each step of the 3-DES algorithm. Parameters 491, 493, and 495 as encryption key creation information 490 that can create these encryption keys 411, 413, and 415 may be stored in the storing unit 300, but this is not necessary. The indices 420 for specifying the encryption key creation information 490 are stored in the storing unit 300 of the contactless communication tag 10 and are transmitted to the tag reader 20 if the tag reader 20 request specifying of the encryption key. Encryption key creation information for creating an encryption key '1324' 411 is '133' 491 and an index for identifying this encryption key creation information is '02' 421. In the same way, an encryption key 'abcd' 413, encryption key creation information '256' 493, and an index '01' 423 correspond to one another, and an encryption key '2345' 415, encryption key creation information '267' 495, and an index '04' 425 correspond to one another. Encryption keys of the tag reader 20 are grouped into three, each of which is an encryption key assigning table for a type of industry, a manufacturer, and a brand.

Upon receipt of product information from the tag reader 20, The encryption/decryption unit 210 of the contactless communication tag 10 transmits indices as the encryption key specifying information 310, i.e., here '02', '01', and '04'. The tag reader 20 looks up corresponding encryption key tables from these indices and extracts encryption key creation information for creating the same encryption key set, i.e., here '1324', 'abcd', and '2345', as the encryption key 410 stored in the contactless communication tag 10, i.e., here '133', '256', and '267', from each of encryption key creation information fields 433, 453, and 473 of the encryption key assigning tables. The tag reader 20 creates corresponding encryption keys by executing a predetermined encryption key creation algorithm based on the encryption key creation information and a seed value to select the created encryption keys as encryption keys for reading the contactless communication tag 10. Thereafter, the encryption/decryption unit 210 of the contactless communication tag 10 encrypts and decrypts information transmitted to and received from the tag reader 20 by sequentially using this plurality of encryption keys.

According to the eighth embodiment of the contactless communication tag 10, once the encryption key is specified, the tag reader 20 can recognize a type of industry, a manufacturer, a brand, or a brand name of the encryption key. In other words, referring to FIG. 4B, based on the encryption key 410, the encryption key creation information 420, and the index, the tag reader 20 can recognize from the received encryption key indices 421, 423, and 425 that a product to which the contactless communication tag 10 is attached is included in a type of accessories, a manufacturer of the product is 'Samah industry, and a brand name of the product is 'CAPACCI'. Thus, in a varied form of the eighth embodiment, the product information 370 and the encryption key specifying information 310 of the storing unit 300 may overlap with each other in practice. In other words, the indices 421, 423, and 425 may be parts of the product information 370. The eighth embodiment of the contactless communication tag 10 according to the present invention has advantages of both the sixth embodiment and the seventh embodiment. Also, in the eighth embodiment, since the indices are transmitted and received, a degree of security is enhanced and updating of the tag reader 20 is facilitated as will described later.

Through this procedure, the tag reader 20 specifies a corresponding encryption key, request product information stored in the contactless communication tag 10, receives a response to the request, and displays the received response on the display unit. If the right contactless communication tag 10 is attached to a product, encryption/decryption procedures between the tag reader 20 and the contactless communication tag 10 are successful, and thus, corresponding product information is successfully displayed on the display unit. If the product is a counterfeit product or a forged product, the encryption/decryption procedures will fail, and thus, meaningless information that is not readable by the display unit or a counterfeit product warning will be displayed. Thus, a customer can check the genuineness of the product.

Information reading unit 750 of the tag reader 20 according to the present invention receives a plurality of product codes related to different product information from the contactless communication tag 10 and sequentially outputs the product codes on the display unit. In other words, with respect to one product, a plurality of product codes is stored in the storing unit 300 of the contactless communication tag 10 and the tag reader 20 sequentially reads in and displays the stored product codes. For example, the first displayed product code among the plurality of product codes is a manufacturer, the second displayed product code is a brand, and the next displayed product code is a unique product number for each product. Thus, a user having a code table can recognize product information from a displayed code sequence. In an embodiment where the display unit has a plurality of color LED, the code sequence may be a binary sequence that indicates on or off of the color LED.

The contactless communication tag 10 or the control unit 200 of the contactless communication tag 10 may have a leaked encryption key updating unit 220. The leaked encryption key updating unit 220 is a module mounted in the contactless communication tag 10 to deactivate a counterfeit tag if at least one of agreed encryption keys is leaked out. The module is mounted in tags that are newly manufactured after leaking of the encryption key is uncovered. The leaked encryption key updating unit 220 discards an existing encryption key with respect to the tag reader 20 that attempts to read the contactless communication tag 10 and directs the tag reader 20 to use a new encryption key that is specified by the leaked encryption key updating unit 220.

The leaked encryption key updating unit 220 applied to the first embodiment of the contactless communication tag 10 according to the present invention transmits a unique master key that should be newly used to the tag reader 20. The tag reader 20 deletes its own master key and records a received master key as a new encryption key. At this time, by appropriately defining a key upgrade protocol between the contactless communication tag 10 and the tag reader 20, it is possible to reduce a danger caused by hacking of a master key.

The leaked encryption key updating unit 220 applied to the second embodiment of the contactless communication tag 10 according to the present invention is mounted in a tag of a type of industry, a manufacturer, a brand, or a product that is the same as a leaked encryption key and transmits a corresponding encryption key that is to be newly used to the tag reader 20. The tag reader 20 discards an existing assigned encryption key and stores a new received encryption key as an encryption key of a corresponding type of industry, a corresponding manufacturer, a corresponding brand, or a corresponding product in an index corresponding to the contactless communication tag 10.

The leaked encryption key updating unit 220 applied to the third embodiment of the contactless communication tag 10 according to the present invention is mounted in the contactless communication tag 10 included in categories such as a type of industry, a manufacturer, a brand, and a product that are the same as the leaked encryption key and transmits corresponding encryption keys that are to be newly used to the tag reader 20. The tag reader 20 updates encryption keys corresponding to indices assigned for the contactless communication tag 10 with new received encryption keys in a table for each category. For example, in the case of the contactless communication tag 10 shown in FIG. 4A, a brand index is designated as '04'. '2345' is assigned as an encryption key corresponding to the brand index '04'. However, the leaked encryption key updating unit 220 may direct the tag reader 20 to update the encryption key '2345' with '5678'. To this end, the leaked encryption key updating unit 220 may directly transmit a new encryption key to the tag reader 20, but may set the new encryption key by selecting one of indices of a spare encryption key, if a sufficient number of unassigned spare encryption keys are secured. For example, if an existing index corresponding to '5678' is '15', the leaked encryption key updating unit 220 transmits '15' instead of '5678', and the tag reader 20 extracts the encryption key '5678' corresponding to '15' from its own table and assigns the encryption key '5678' as an encryption key corresponding to the index '04'. As a result, the same encryption key corresponds to the indices '04' and '15' in the tag reader 20.

The leaked encryption key updating unit 220 applied to the fourth embodiment of the contactless communication tag 10 according to the present invention updates leaked encryption keys among a plurality of encryption keys stored in the contactless communication tag 10. The tag reader 20 updates the encryption key stored in the index corresponding to the leaked encryption key in the encryption key table with a received new encryption key.

The leaked encryption key updating unit 220 applied to the fifth embodiment of the contactless communication tag 10 according to the present invention updates the entire plurality of encryption key sets stored in the contactless communication tag 10. Thus, the leaked encryption key updating unit 220 of the contactless communication tag 10 transmits a necessary new plurality of encryption key sets to the tag reader 20 and requests the tag reader 20 to update the encryption key sets corresponding to the tag reader 20. The tag reader 20 first specifies encryption key sets assigned to the contactless communication tag 10 in the stored encryption key table and then sequentially updates the entire encryption key sets with received encryption keys in the order of receipt of the encryption keys.

The leaked encryption key updating unit 220 applied to the fifth embodiment of the contactless communication tag 10 according to the present invention updates the entire plurality of encryption key sets stored in the tag 10. Thus, the leaked encryption key updating unit 220 of the contactless communication tag 10 transmits a necessary new plurality of encryption key sets to the tag reader 20 and requests the tag reader 20 to update the encryption key sets corresponding to the tag reader 20. The tag reader 20 first specifies the encryption key sets assigned to the contactless communication tag in the stored encryption key table and updates the entire encryption key sets with received encryption keys in the order of receipt of the encryption keys.

The leaked encryption key updating unit 220 applied to the sixth embodiment of the contactless communication tag 10 according to the present invention transmits encryption key creation information that should be newly used to the tag reader 20. At this time, an encryption key corresponding to new encryption key creation information is stored in the contactless communication tag 10. The tag reader 20 may register existing commonly used encryption key creation information as a bad tag in a black list. In this case, if a specific tag requests genuineness authentication, the tag reader 20 can more accurately determine whether the tag is a counterfeit tag or not with reference to the black list and a date of manufacture. Thus, it is possible to determine a tag manufactured before a specific date of manufacture to be genuine and a tag manufactured after the specific date of manufacture to be counterfeit.

The leaked encryption key updating unit 220 applied to the seventh embodiment of the contactless communication tag 10 according to the present invention transmits encryption key creation information that should be newly used to the tag reader 20. For example, it is assumed that the encryption key '1324' 411 is leaked out among the encryption keys in FIG. 4B. At this time, a new encryption key '1567' is stored in a newly released tag instead of the encryption key '1324' and encryption key creation information corresponding to the new encryption key '1567' is '138'. In this case, the leaked encryption key updating unit 220 deletes encryption key creation information '133' corresponding to the index '02' that is assigned to the tag in the encryption key table 430 of the tag and requests recording of new encryption key creation information '138'. Thus, the tag reader 20 extracts '138' as encryption key creation information corresponding to the index '02' from the encryption key table 430 and creates the encryption key '1567'. As a result, product information cannot be read with respect to a counterfeit key having the encryption key '1324' or an existing distributed tag and such a counterfeit or an existing distributed tag is determined to be counterfeit.

Also, the contactless communication tag 10 or the control unit 200 of the contactless communication tag 10 according to the present invention can include the replay attack blocking unit 230. In encryption techniques, replay attack means attempting to access a server by hacking a log-in message transmitted by a user in an encrypted authentication procedure and retransmitting the hacked message to the server. To cope with such an attack, the server transmits a log-in request message to a client after including a random number in the log-in request message and encrypting the log-in request message, and the client includes the same random number in a response log-in message. The server checks the random number when authenticating the received log-in message and permits log-in only when the random number is the same as that transmitted by the server. Since the random number is changed each time, it is possible to prevent a possibility of repeatedly using the same log-in message by aid of such replay blocking techniques.

The present invention introduces such replay blocking techniques in genuine authentication. Such introduction can effectively prevent a read request message of the tag reader 20 or a response message of the contactless communication tag 10 from being hacked, copied and used. Thus, replay attack on a system of the present invention is impossible and genuineness authentication can have a higher degree of reliability.

The contactless communication tag 10 or the control unit 200 of the contactless communication tag 10 according to the present invention may include the post management processing unit 270. Reading detail information is stored in the storing unit 300 of the contactless communication tag 10. Every time of reading, the information providing unit 250 stores the reading detail information such as a serial number and a date of reading of the tag reader 20 in an assigned area of the storing unit 300. The information providing unit 250 does not provide product information when a value stored in a counter area that manages the number of reading is more than a predetermined value. However, the post management processing unit 270 is designed to provide not only product information but also the reading detail information with respect to a specific terminal that logs in with a specific encryption key, i.e., a reader for managing, regardless of the number of reading. The reader is configured with hardware that is similar to a common reader. However, the reader can recognize a date of sale, a user that performs genuineness authentication, and a date of genuineness authentication by reading information of a tag discarded in a distributor or a tag attached to a returned product. Therefore, the reader can effectively use the information as post customer management information of customer-oriented marketing.

Also, the contactless communication tag 10 or the control unit 200 of the contactless communication tag 10 may include a refresh processing unit 290. In general, in nonvolatile memory, the number of available reading or a period of available reading is limited after recording and it is known that data is only preserved for about 10 years. However, 10 years is too short to products that are possessed for a long period of time such as surveying reports, antiques, pictures, and sculptures. If the contactless communication tag 10 includes the refresh processing unit 290 in the contactless communication tag 10 for application fields, data is re-recorded in the storing unit 300 Every time of reading and refresh processes the data. Refresh processing should be performed on the entire data, including encryption keys, product information, and counter values, stored in the storing unit 300. In this case, a refresh buffer is included in the contactless communication tag 10, and the refresh processing unit 290 performs refresh processing by repeating read and write operations in the unit of blocks having a size corresponding to capacity of the refresh buffer. In the case of products that are refresh-processed, it is desirable to set the number of available reading large or not to limit the number of available reading.

Hereinafter, preferred embodiments of the tag reader 20 will be described.

FIG. 3 is a schematic block diagram of a configuration of the tag reader 20 according to the present invention.

Referring to FIG. 3, the mobile communication terminals 20-1 and 20-2 having the tag read function according to the present invention include a manipulation unit 930, a display unit 950, a sound output unit 960, a battery (not shown), a tag communication unit 500, a storing unit 910, an information reading unit 750, and a control unit 700.

The manipulation unit 930 includes one or two buttons such as read start button and information transmission button in addition to key buttons of a general mobile communication terminal. Alternatively, specific buttons among key buttons included in a mobile communication terminal may function as key buttons related to a read function such as the read start button and the information transmission button when the mobile communication terminals 20-1 and 20-2 having the tag read function are controlled to perform read operations. The display unit 950 uses an LCD of the mobile communication terminals 20-1 and 20-2. The sound output unit 970 uses a speaker of the mobile communication terminals 20-1 and 20-2. A wireless communication unit 970 is a circuit that provides a mobile communication function and is a MSM group chip of Qualcomm and a related RF circuit that supports a code division multiple access (CDMA) communication.

The tag communication unit 500 wirelessly exchanges data with the contactless communication tag 10 and wirelessly transmits necessary power. The tag communication unit 500 includes an antenna 510, a power sending unit 531, a demodulating unit 533, and a modulating unit 535. The antenna 510 wirelessly transmits and receives data with the contactless communication tag 10. The antenna 510 may be formed in a pattern printed along the circumference of the mobile communication terminals 20-1 and 20-2 having the tag read function. The power sending unit 531 wirelessly transmits power necessary to the contactless communication tag 10 through the antenna 510. The demodulating unit 533 demodulates a signal received from the contactless communication tag 10 through the antenna 510. The modulating unit 535 demodulates a signal to be transmitted to the contactless communication tag 10. Each of components constituting the tag communication unit 500 corresponds to the antenna 110, the power supply unit 131, the modulating unit 135, and the demodulating unit 133 included in the contactless communication means 100 of the contactless communication tag 10 and will not described in detail.

A main program for controlling the entire system and seed values for creating encryption keys necessary to information exchange are stored in the storing unit 910. On the other hand, the main program and a plurality of encryption keys necessary to information exchange can be stored in the storing unit 910. The storing unit 910 may include a nonvolatile memory, e.g., ROM, and a temporary memory space RAM or a single flash memory. Also, reading detail information about tags read by the mobile communication terminals 20-1 and 20-2 having the tag read function is stored in the storing unit 910. Marketers can recognize inclination of customers by reading the reading detail information from the mobile communication terminals 20-1 and 20-2 connected to their computers.

The control unit 700 may be implemented as a commercial microprocessor. The information reading unit 750 and the encryption/decryption unit 710 may be implemented as software in the control unit 700 or manufactured as a component separated from the control unit 700. The information reading unit 750 requests product information from the contactless communication tag 10 in response to a command from the manipulation unit 930 and displays the product information received from the contactless communication tag 10 on the display unit 950. The encryption/decryption unit 710 encrypts and decrypts information transmitted to and received from the contactless communication tag 10 through the tag communication unit 500.

The information reading unit 750 interacts with the information providing unit 250 of the contactless communication tag 10 and the encryption/decryption unit 710 interacts with the encryption/decryption unit 210 of the contactless communication tag 10. The information reading unit 750 displays product information received from the contactless communication tag 10 on the display unit 950 in the form of texts or graphics. When the display unit 950 includes 7-segment or color LED, the information providing unit 950 displays product codes as product information received from the contactless communication tag 10 on the display unit 950. In this case, the information providing unit 750 receives a plurality of product codes from the information providing unit 250 of the contactless communication tag 10 and sequentially outputs the received product codes on the display unit 950. The plurality of product codes is grouped into one message and transmitted from the information providing unit 250 of the contactless communication tag 10, or the plurality of product codes is sequentially transmitted to the mobile communication terminals 20-1 and 20-2 having the tag read function from the information providing unit 250 in response to a request from the information reading unit 750 of the mobile communication terminals 20-1 and 20-2. The information reading unit 750 extracts the plurality of product codes from a received message and sequentially displays the extracted product codes on the display unit 950 at predetermined time intervals. The information reading unit 750 sequentially outputs received product codes on the display unit. According to a result of reading of the information reading unit 750, the sound output unit 970 can output a beep sound. The information reading unit 750 also includes a real time clock circuit to calculate current time. The information reading unit 750 transmits time of reading and a serial number of a reader to a tag Every time of reading to make the time and serial number stored as a part of reading detail information.

The encryption/decryption unit 710 receives encryption key creation information from the contactless communication tag 10 through the tag communication unit 500, creates an encryption key from the received encryption key creation information and a seed value stored in the storing unit 910 and processes encryption and/or decryption using the created encryption key. Also, the encryption/decryption unit 710 receives encryption key specifying information by communicating with the encryption/decryption unit 210 of the contactless communication tag 10, selects keys related to a currently read tag from among encryption keys for a plurality of types of industry and/or brands and/or products which are stored in the storing unit 910, and processes communication between the contactless communication tag 10 and the mobile communication terminals 20-1 and 20-2 using the selected keys. Such a communication procedure will be described in detail later. The encryption/decryption unit 710 of the mobile communication terminals 20-1 and 20-2 corresponds to the encryption/decryption unit 210 of the contactless communication tag 10 and may be configured to correspond to the above-described embodiments of the contactless communication tag 10. Since encryption/decryption procedures performed by the encryption/decryption unit 710 of embodiments of the mobile communication terminals 20-1 and 20-2 are essentially identical to those performed by the encryption/decryption unit 210 of the embodiments of the contactless communication tag 10, they will not described in detail here.

In a first embodiment of the mobile communication terminals 20-1 and 20-2 having the tag read function according to the present invention, the encryption/decryption unit 710 corresponds to the encryption/decryption unit 210 of the first embodiment of the contactless communication tag 10. In this embodiment, the storing unit 910 only stores a master key as a single encryption key. The encryption/decryption unit 710 encrypts and decrypts information transmitted to and received from the contactless communication tag 10 using the master key.

In a second embodiment of the mobile communication terminals 20-1 and 20-2 having the tag read function according to the present invention, the encryption/decryption unit 710 corresponds to the encryption/decryption unit 210 of the second embodiment of the contactless communication tag 10. In this embodiment, the storing unit 910 stores a plurality of encryption keys corresponding to indices. The encryption/decryption unit 710 receives encryption key specifying information, e.g., indices, from a tag, specifies an encryption key, and encrypts and decrypts information transmitted to and received from the tag using the specified encryption key.

In a third embodiment of the mobile communication terminals 20-1 and 20-2 having the tag read function according to the present invention, the encryption/decryption unit 710 corresponds to the encryption/decryption unit 210 of the third embodiment of the contactless communication tag 10. In this embodiment, as conceptually shown in a lower portion of FIG. 4A, an encryption key table is stored in the storing unit 910 based on each category, i.e., a type of industry, a manufacturer, a brand, and a product name. The encryption/decryption unit 710 receives indices as plural encryption key specifying information from the contactless communication tag 10 and specifies an encryption key set for the contactless communication tag 10 from each corresponding table. The encryption/decryption unit 710 sequentially performs multiple encryption/decryption on information transmitted to and received from the contactless communication tag 10 using encryption keys.

In a fourth embodiment of the mobile communication terminals 20-1 and 20-2 having the tag read function according to the present invention, the encryption/decryption unit 710 corresponds to the encryption/decryption unit 210 of the fourth embodiment of the contactless communication tag 10. In this embodiment, a plurality of encryption keys is stored in the storing unit 910 in the form of tables. The encryption/decryption unit 710 receives indices as encryption key specifying information and looks up an encryption table to specify encryption keys for the contactless communication tag 10. The encryption/decryption unit 710 encrypts and decrypts information transmitted to and received form the contactless communication tag 10 using the specified encryption keys.

In a fifth embodiment of the mobile communication terminals 20-1 and 20-2 having the tag read function according to the present invention, the encryption/decryption unit 710 corresponds to the encryption/decryption unit 210 of the fifth embodiment of the contactless communication tag 10. In this embodiment, similarly with the third embodiment, a plurality of encryption tables is stored in the storing unit 910. The encryption/decryption unit 710 receives indices as encryption key specifying information from the contactless communication tag 10 and looks up the encryption key tables to specify an encryption key set for the contactless communication tag 10. The encryption/decryption unit 710 sequentially performs multiple encryption/decryption on information transmitted to and received from the contactless communication tag 10 using encryption keys.

In a sixth embodiment of the mobile communication terminals 20-1 and 20-2 having the tag read function according to the present invention the encryption/decryption unit 710 corresponds to the encryption/decryption unit 210 of the sixth embodiment of the contactless communication tag 10. In this embodiment, the encryption/decryption unit 710 includes an encryption key creation module. A seed value necessary to the encryption key creation module can be stored in a data area of the storing unit 910 or incorporated and stored as a program code of the encryption key creation module. The encryption/decryption unit 710 creates encryption keys by executing the encryption key creation module using the encryption key creation information received from the contactless communication tag 10 and encrypts and decrypts information transmitted to and received from the contactless communication tag 10 using the encryption keys.

In a seventh embodiment of the mobile communication terminals 20-1 and 20-2 having the tag read function according to the present invention, the encryption/decryption unit 710 corresponds to the encryption/decryption unit 210 of the seventh embodiment of the contactless communication tag 10. In this embodiment, the encryption/decryption unit 710 includes an encryption creation module. A seed value necessary to the encryption key creation module can be stored in a data area of the storing unit 910 or incorporated and stored as a program code of the encryption key creation module. The encryption/decryption unit 710 creates a sequence of encryption keys by sequentially executing the encryption key creation module using the received encryption key creation information and sequentially performs multiple encryption/decryption on information transmitted to and received from the contactless communication tag 10 using the encryption keys.

In an eighth embodiment of the mobile communication terminals 20-1 and 20-2 having the tag read function according to the present invention, the encryption/decryption unit 710 corresponds to the encryption/decryption unit 210 of the eighth embodiment of the contactless communication tag 10. Tables as conceptually shown in a lower portion of FIG. 4B are stored in the storing unit 910. The encryption/decryption unit 710 extracts encryption key creation information from indices received from the contactless communication tag 10 with reference to the encryption key table. The encryption/decryption unit 710 creates a sequence of encryption keys by sequentially executing the encryption creation module using the extracted encryption key creation information and sequentially performs multiple encryption/decryption on information transmitted to and received from the contactless communication tag 10 using the encryption keys.

As described above, the mobile communication terminals 20-1 and 20-2 having the tag read function according to the present invention can specify at least two product information among a type of industry, a manufacturer, a brand, and a product name from received encryption key specifying information, encryption key creation information, or indices about encryption key creation information and display the specified product information on the display unit 950. Such specifying and displaying can be applied to at least the third embodiment, the fifth embodiment, the seventh embodiment, and the eighth embodiment. As shown in FIGS. 4A and 4B, product information corresponding to indices for each category in which corresponding encryption keys are included is stored in the storing unit 910 of the mobile communication terminals 20-1 and 20-2. Thus, it is possible to specify at least a portion of product information based on indices received from the contactless communication tag 10.

The mobile communication terminals 20-1 and 20-2 according to the present invention selectively include at least one of an information providing unit 760, a leaked encryption key updating unit 790, a replay attack blocking unit 730, a reader authentication unit 770, and a refresh processing unit 720. These components may be incorporated in the control unit 700.

The information providing unit 760 transmits information read details read by the information reading unit 750 to the service management server 40 via the wireless communication unit 970. The information providing unit 760 transmits information read by the information reading unit 750, i.e., product related information including at least one of a type of industry, a manufacturer, a brand, a product name, a grade, a model name, a producing center, a date of manufacture, and a serial number and information reading detail information such as a price and a time of authentication. Purchasing information about products that have been purchased after genuineness authentication may be included in the information transmitted to the service management server 40 from the information transmitting unit 760. A owner of the mobile communication terminals 20-1 and 20-2 checks product information on the display unit 950 by pressing a genuine product authentication key and purchases a product. If a purchasing completion key of the manipulating unit 930 is pressed after completion of purchasing, a list of products whose genuineness is recently authenticated is read from reading detail information stored in the storing unit 910 and displayed on the display unit 950. Once a user selects information from the list and presses a confirm key, a corresponding product is processed as being purchased. The purchasing information is gathered in the storing unit 910 and is then collectively transmitted upon the press of a transmission key in the manipulating unit 930. Information transmission is performed via the wireless communication unit 970 or a wireless Internet network or information may be transmitted in the form of a simple shot message. On the other hand, every time a user presses the purchasing completion key, purchasing information at the time of the press of the purchasing completion key is transmitted to the service management server 40 in the form of a short message.

Upon receipt of encryption key update request information concerning a leaked encryption key from the contactless communication tag 10, the leaked encryption key updating unit 790 discards a corresponding encryption key stored in the storing unit 910 and updates an encryption key by storing a newly assigned encryption key in the storing unit 910. Detailed embodiments and operations thereof are already described in relation to the leaked encryption key updating unit 220 of the contactless communication tag 10 and will not be described.

The replay attack blocking unit 730 generates an one-time use random number, adds the random number to information to be transmitted, and provides the information to the encryption/decryption unit 710, extracts the random number from information received as a response to the information, and checks if the extracted random number is the same as the original random number added to the information to be transmitted, thereby blocking replay attack. The replay attack blocking unit 730 corresponds to the replay attack blocking unit 230 of the contactless communication tag 10 and will not be described in detail.

The reader authentication unit 770 communicates with an external portable tag reader to authenticate each other and displays authentication result information on the display unit 950. Such an authentication function allows the tag reader 20 and the external portable tag reader to mutually check reliability of them. Authentication between the two tag readers is also performed between the tag communication unit 500. For authentication, a specific encryption key is predetermined. In the same way, the encryption/decryption unit 710 operates in authentication between tag readers. It is preferable that the replay attack blocking unit 730 intervenes in authentication to block hacking performed using communication between tag readers. Such an operation of the replay attack blocking unit 730 will be described in detail later.

The refresh processing unit 720 reads encryption key related information stored in the storing unit 910 that is non-volatile memory and re-records the read information. The main program that controls the control unit 700 of the mobile communication terminals 20-1 and 20-2 having the tag read function is a memory device such as electronically erasable programmable read-only memory (EEPROM) in which data is permanently stored. Also, like the encryption key related information, information that should be stored differently according to the mobile communication terminals 20-1 and 20-2 having the tag read function is stored in flash memory. In the case of flash memory, a term during which recorded data can be read is limited to 10 years. As a result, when the flash memory is used for a long period of time, there is a possibility of losing the encryption key. Thus, the mobile communication terminals 20-1 and 20-2 having the tag read function including the refresh processing unit 720 re-record read data in the same address whenever reading the encryption key related information, thereby solving such a problem.

In the present invention, tag readers are implemented in the mobile communication terminals 20-1 and 20-2. At this time, the manipulating unit 930 can use one or several keys from keypads of the mobile communication terminals 20-1 and 20-2 and use an LCD of the mobile communication terminals 20-1 and 20-2 as the display unit 950. The storing unit 910 and the control unit 700 may be basically mounted in the mobile communication terminals 20-1 and 20-2, but, in this case, information related to read operations may be leaked. Consequently, the mobile communication terminals 20-1 and 20-2 having the tag read function include separately designed ASIC therein. The ASIC includes an analog wireless circuit and a modulation/demodulation circuit of the tag communication unit 500, non-volatile memory as the storing unit 910, and a microprocessor as the control unit 700. The ASIC and a microprocessor for controlling a system of the mobile communication terminals 20-1 and 20-2 communicate through their respective host interfaces. Since this communication permits only a limited number of commands, it is possible to strictly keep security. Thus, the mobile communication terminals 20-1 and 20-2 having the tag read function according to the present invention can be completed by adding separately designed ASIC and an antenna pattern to a conventional cellular phone. At this time, a separate software module for communication with the ASIC and user interface should be additionally installed in the mobile communication terminals 20-1 and 20-2.

Figure 5:
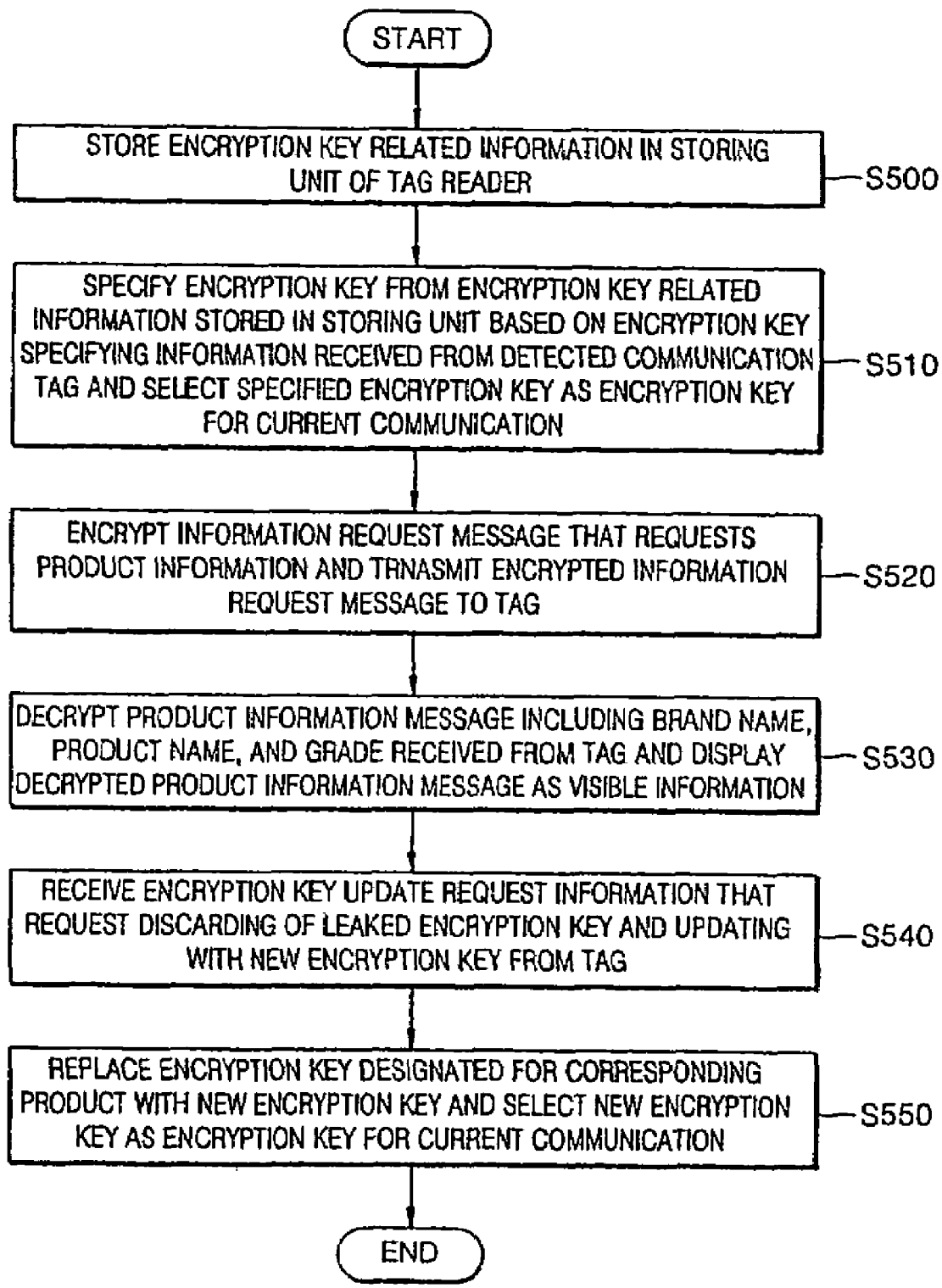
FIG. 5 is a flowchart illustrating a product information read-out procedure in the mobile communication terminal according to the present invention.

FIG. 5 is a flowchart illustrating a product information read-out procedure in the mobile communication terminals 20-1 and 20-2 according to the present invention.

Referring to FIG. 5, in first step S500, encryption key related information corresponding to an encryption key that is set based on at least one reference among a type of industry, a manufacturer, a brand, and a product name is stored in the storing unit 910 of the mobile communication terminals 20-1 and 20-2 having the tag read function. In step S510, the mobile communication terminals 20-1 and 20-2 specifies an encryption key among the encryption key related information stored in the storing unit 910 based on encryption key specifying information received from the detected contactless communication tag 10 and selects the specified encryption key as an encryption key for current communication. At this time, the mobile communication terminals 20-1 and 20-2 having the tag read function specifies an encryption key by creating the encryption key using encryption key creation information received from the tag 10 and encryption key seed information stored in the storing unit 910. In step S520, the mobile communication terminals 20-1 and 20-2 having the tag read function encrypts and transmits an information request message that requests product information to the tag 10. In step S530, the mobile communication terminals 20-1 and 20-2 having the tag read function decrypts a product information message received from the tag, including a brand name, a product name, and a grade, and displays the product information message as visible information. The mobile communication terminals 20-1 and 20-2 having the tag read function encrypts the information request message by adding a random number to the information request message, decrypts the product information message received from the contactless communication tag 10, and checks if the random number of the decrypted product information message is the same as the original random number added to the information request message, thereby additionally coping with replay attack. Also, once the mobile communication terminals 20-1 and 20-2 having the tag read function receives encryption key updating request information that requests discarding of a leaked encryption key and updating with a new encryption key in step S540, the mobile communication terminals 20-1 and 20-2 having the tag read function replaces an encryption key assigned to a corresponding product with a new encryption key and selects the new encryption key as an encryption key for current communication in step S550.

Figure 6:
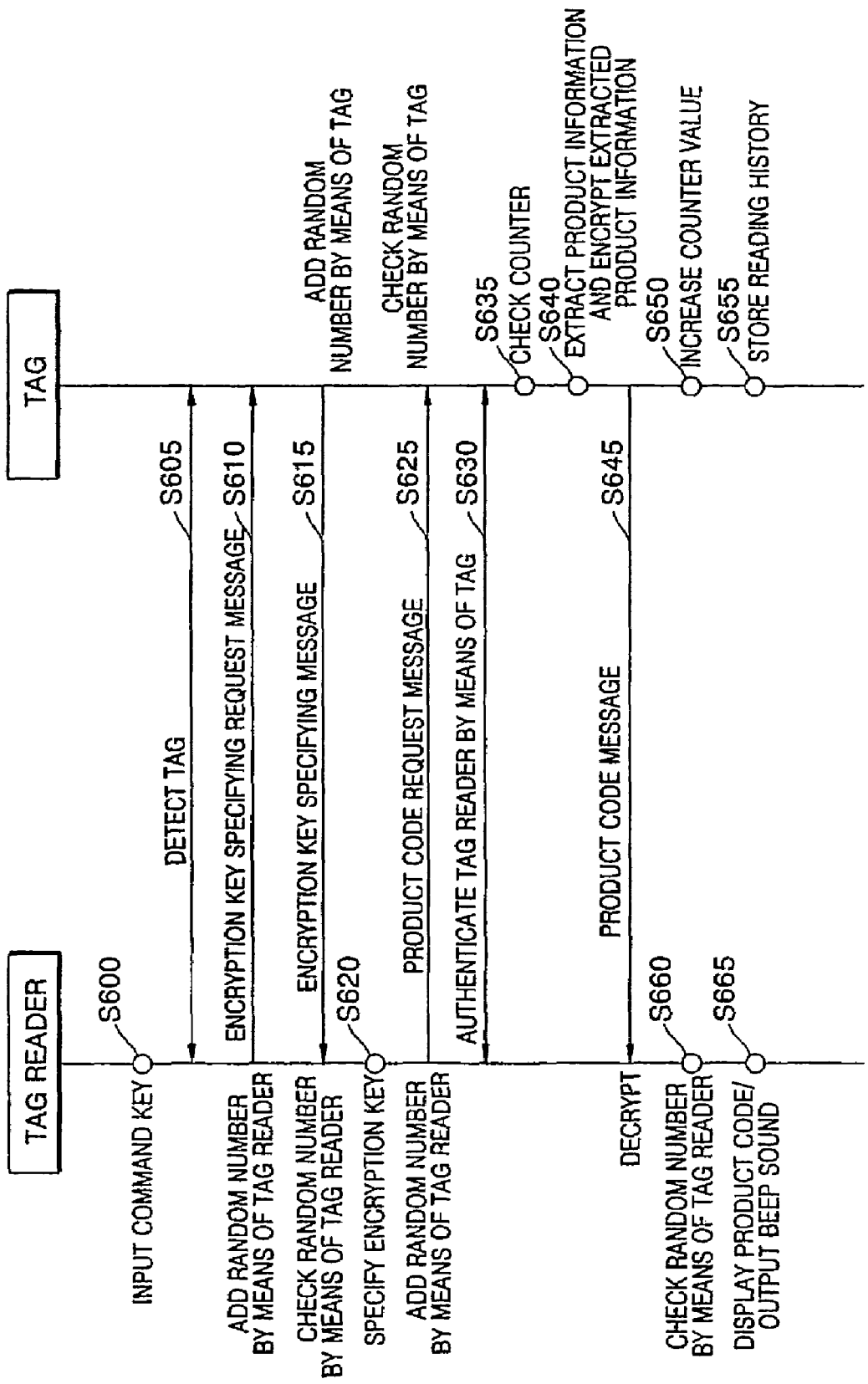
FIG. 6 is a flowchart illustrating a communication procedure between a tag and the mobile communication terminal.

FIG. 6 is a flowchart illustrating a communication procedure between the tag 10 and mobile communication terminals 20-1 and 20-2 having the tag read function.

Referring to FIG. 6, a user requests check of product information by pressing a specific button of the mobile communication terminals 20-1 and 20-2 having the tag read function in step S600. Thus, in step S605, the mobile communication terminals 20-1 and 20-2 having the tag read function detects existence of the tag 10. Such detection may be, but is not limited to, a detection method that complies with ISO14443 standards. The mobile communication terminals 20-1 and 20-2 having the tag read function executes a protocol that selectively specifies an encryption key. One encryption key to be used for communication with the mobile communication terminals 20-1 and 20-2 having the tag read function or a plurality of encryption keys one one of which is used after being specified by the following protocol may be stored in the tag 10. To specify an encryption key, the mobile communication terminals 20-1 and 20-2 having the tag read function transmits an encryption key specifying request message that requests specifying of the encryption key to the tag 10, in step S610. At this time, the mobile communication terminals 20-1 and 20-2 having the tag read function adds a random number to an encryption key specifying request message and transmits the encryption key specifying request message. The tag 10 transmits encryption key specifying information necessary to specifying of the encryption key as a response to the encryption key specifying request message, e.g., an index of the encryption key, in step S615. At this time, the tag 10 adds a random number received from the mobile communication terminals 20-1 and 20-2 having the tag read function and a random number generated in the tag 10 to the encryption key specifying message and then transmits the encryption key specifying message. Thus, it is possible to protect not only a transmission message but also a received message from replay attack. An encryption method used herein is a 3-DES method, and since this method is a symmetric key method, an encryption key and a decryption key are identical.

The tag 10 can provide encryption key creation information used for creation of an encryption key as encryption key specifying information to the mobile communication terminals 20-1 and 20-2 having the tag read function. The encryption key creation information is a parameter used in an encryption key creation function. In this case, an encryption key creation function is implemented as a program in the tag reader 20. In step S620, the mobile communication terminals 20-1 and 20-2 having the tag read function creates an encryption key using an encryption key creation function based on a seed value stored in the storing unit 910 and the encryption key creation information received from the tag 10. For example, when a seed value is 123456, the parameter may be an index for selecting one of several encryption keys created from a permutation & combination of the seed value. On the other hand, the parameter may be an index for selecting one of numerous encryption keys that can be drawn by scrambling a data word indicating the seed value in the unit of blocks. Also, the parameter may be a parameter related to division of blocks in an algorithm for scrambling a data word indicating the seed value in the unit of blocks. Regarding creation of the encryption key, various methods are well known and descriptions thereof will be omitted. If a plurality of seed values is stored in the tag reader 20, encryption key creation information stored in the tag 10 includes an index for specifying the seed values. In this case, other components are the same as embodiments having a single seed value, descriptions thereof will be omitted. By using the above-described encryption key creation function, it is possible to add genuineness authentication target products having different encryption keys as many as encryption keys that can be created, without a need to upgrade the mobile communication terminals 20-1 and 20-2 having the tag read function after a user buys the mobile communication terminals 20-1 and 20-2 having the tag read function.

The encryption key specifying information may be an index for specifying one of a plurality of encryption keys. In this case, a plurality of encryption keys (e.g., several hundreds of encryption keys) corresponding to encryption keys of all the tags is stored in the mobile communication terminals 20-1 and 20-2 having the tag read function. Indices for specifying an encryption key of the tag 10 and one of the plurality of encryption keys are stored in the tag 10. The mobile communication terminals 20-1 and 20-2 having the tag read function receive these indices and can specify one encryption key that can be used for a current tag among the plurality of encryption keys. In this way, by using the plurality of encryption keys, it is possible to add genuineness authentication target products as many as encryption keys without a need for a user to upgrade the mobile communication terminals 20-1 and 20-2 having the tag read function.

Also, if the plurality of encryption keys is stored in the tag 10, encryption key specifying information may be a plurality of indices that specify a plurality of encryption keys stored in the tag 10. The mobile communication terminals 20-1 and 20-2 having the tag read function respond by selecting one of the plurality of indices received from the tag 10 at random. Thus, in the tag 10, an encryption key is specified. In this case, the mobile communication terminals 20-1 and 20-2 having the tag read function specify as a master key with the tag 10 an encryption key corresponding to one of the plurality indices received from the tag 10 that is selected among stored numerous encryption keys. Thus, a genuineness product authentication system including the tag 10 and the mobile communication terminals 20-1 and 20-2 having the tag read function according to the present invention can provide more enhanced security.

In the above-described three embodiments, selection of an encryption key can be performed for a type of industry and/or a manufacturer and/or a brand and/or a product. Thus, the same encryption key can be used for products of the same type of industry or products of the same type of industry that are manufactured by the same manufacturer. Thus, if manufacturers of the same type of industry or the same manufacturers of the same type of industry produce new products and the new products are read by the mobile communication terminals 20-1 and 20-2 having the tag read function according to the present invention, product information can be read without a need to update encryption key information of the mobile communication terminals 20-1 and 20-2 having the tag read function. Also, when an encryption key is commonly used for products of the same kind, more new products can be added to the mobile communication terminals 20-1 and 20-2 having the tag read function after release of the new products.

Next, the mobile communication terminals 20-1 and 20-2 having the tag read function transmit a product information request message that requests product information to the tag 10 in step S625. At this time, the mobile communication terminals 20-1 and 20-2 having the tag read function add a random number received from the tag 10 and a newly created random number of the mobile communication terminals 20-1 and 20-2 having the tag read function to the product information request message and then encrypts the product information request message using the specified master encryption key. The tag 10 that receives the product information request message from the mobile communication terminals 20-1 and 20-2 having the tag read function extracts the random number that is included in the received product information request message and is previously transmitted by the tag 10 and checks if the extracted random number is the same as the previously transmitted random number, thereby checking if a received signal is replay attack. At this time, the tag 10 may further perform a process of optionally authenticating the mobile communication terminals 20-1 and 20-2 having the tag read function. Authentication of the mobile communication terminals 20-1 and 20-2 having the tag read function by the tag 10 may be performed by receiving a response message to a specific code message transmitted to the mobile communication terminals 20-1 and 20-2 having the tag read function. As mentioned above, a portion of product information may be previously secured from an encryption key index or an encryption key creation information index.

In step S635, the tag 10 extracts the counter value of the storing unit 300 and checks the extracted counter value. If it is determined that reading is already completed more than allowable times, the tag 10 blocks further reading. On the other hand, if the extracted counter value is smaller than allowable times, the tag 10 extracts product information from the storing unit 300 and creates a product information message that is a response message, in step S640. At this time, after adding a random number received from the mobile communication terminals 20-1 and 20-2 having the tag read function to the product information, the tag 10 encrypts the product information using a master key, thereby creating a product information message. The tag 10 transmits the created product information message to the mobile communication terminals 20-1 and 20-2 having the tag read function in step S645. After transmission of the product information, the tag 10 increases the counter value of the storing unit 300 in step S650 and stores reading history information including date and time of reading and a serial number of the mobile communication terminals 20-1 and 20-2 having the tag read function that requests reading, in step S655. In step S660, the mobile communication terminals 20-1 and 20-2 having the tag read function receive the product information message from the tag 10, decrypt the received product information message, and check if a received signal is replay attack by checking if a random number included in the decrypted message is the same as the original transmitted random number. If it is determined that the received signal is not an unfaithful response by replay attack, the mobile communication terminals 20-1 and 20-2 having the tag read function display product information in step S665.

An update processing procedure may be performed on a leaked encryption key between the tag 10 and the mobile communication terminals 20-1 and 20-2 having the tag read function. In this case, as shown in FIG. 4, if the mobile communication terminals 20-1 and 20-2 having the tag read function transmit the encryption key specifying request message to the tag 10, the tag 10 transmits an encryption key update request message to the mobile communication terminals 20-1 and 20-2 having the tag read function, instead of the encryption key specifying message. Once the mobile communication terminals 20-1 and 20-2 having the tag read function receive the encryption key update request message, an existing encryption key that is internally assigned to a corresponding tag is discarded and is replaced by a new encryption key. Also, the mobile communication terminals 20-1 and 20-2 having the tag read function specify a new updated encryption key as an encryption key for communication with the tag 10. Through these processes, once the new encryption key is designated as the encryption key for communication, the tag 10 and the mobile communication terminals 20-1 and 20-2 having the tag read function perform S620 through S665.

Figure 7:
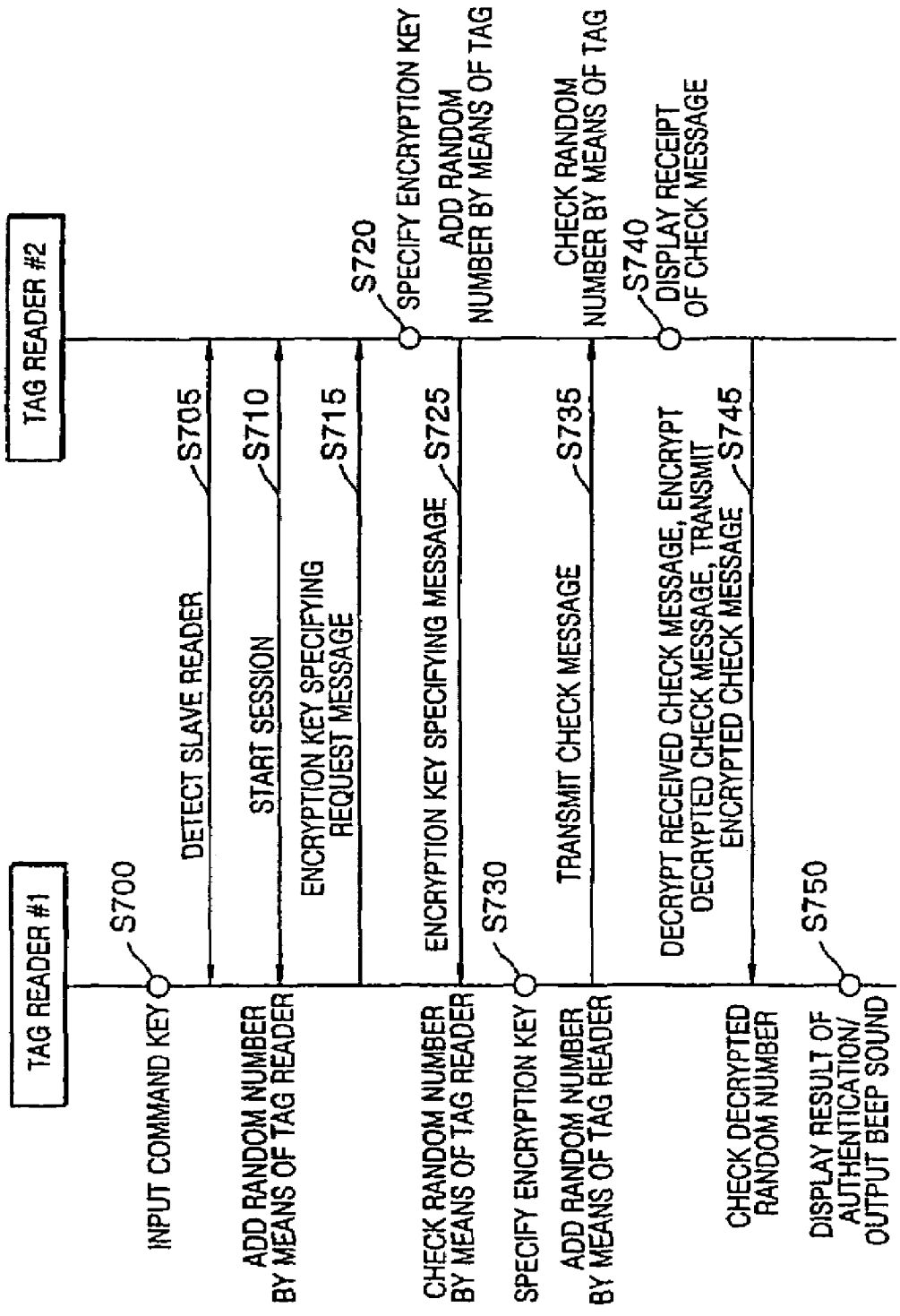
FIG. 7 is a flowchart illustrating an authentication procedure performed between a mobile communication terminal #1 and a mobile communication terminal #2, according to an embodiment of the present invention.

FIG. 7 is a flowchart illustrating an authentication procedure performed between a tag reader #1 and a tag reader #2, according to an embodiment of the present invention.

Referring to FIG. 7, one of the two tag readers is designated as a master in the authentication procedure. Such designation may allow a user to operate a tag reader that first presses an authentication request button as a master tag reader, in step S700. The master tag reader investigates existence of neighboring slave tag readers in step S705. After the master tag reader and slave tag readers are determined, a procedure for opening a communication session between two terminals progresses in step S710. The master tag reader creates a session identifier, transmits the session identifier to the slave tag readers, and a communication between two tag readers includes the same session identifier, thereby maintaining the communication session between tag readers. Thus, even in an environment that shares the same radio frequency, a specific connection state can be maintained or managed. Thereafter, a procedure of assigning an encryption key necessary to communication is performed through exchange of an encryption key specifying request message and an encryption specifying message between tag readers in steps S715 through S730. This procedure is similar to a procedure of specifying a master key between the tag and the tag reader and will not be described in detail.

An authentication procedure between tag readers entirely depends on encryption. In other words, in the case of a proper tag reader, it is assumed that the proper tag reader may have a proper encryption key. Thus, once the master tag reader encrypts a check message using its own encryption key and transmits the encrypted check message to the tag reader in step S735, the slave tag reader decrypts the received check message, encrypts the decrypted check message, and then transmits the encrypted check message, in step S745. At this time, the slave tag reader may display on the display unit in step S740 that the check message is received. Thereafter, the master tag reader decrypts the received message and checks if the received message is replay attack by checking the random number of the received message. If the extracted message is the same as the original transmitted message, the master tag reader determines that the slave tag reader is a tag reader having the right encryption key. On the other hand, if the extracted message is different from the original transmitted message, the master tag reader determines that the slave tag reader is an unfaithful tag reader. The master tag reader displays a result of determination concerning the slave tag reader in step S750. However, the present invention is not limited to these embodiments, and the slave tag reader may respond through message processing, e.g., mapping to the received message according to a previously agreed rule in the unit of bytes or words, after decrypting the received message.

Figure 8:
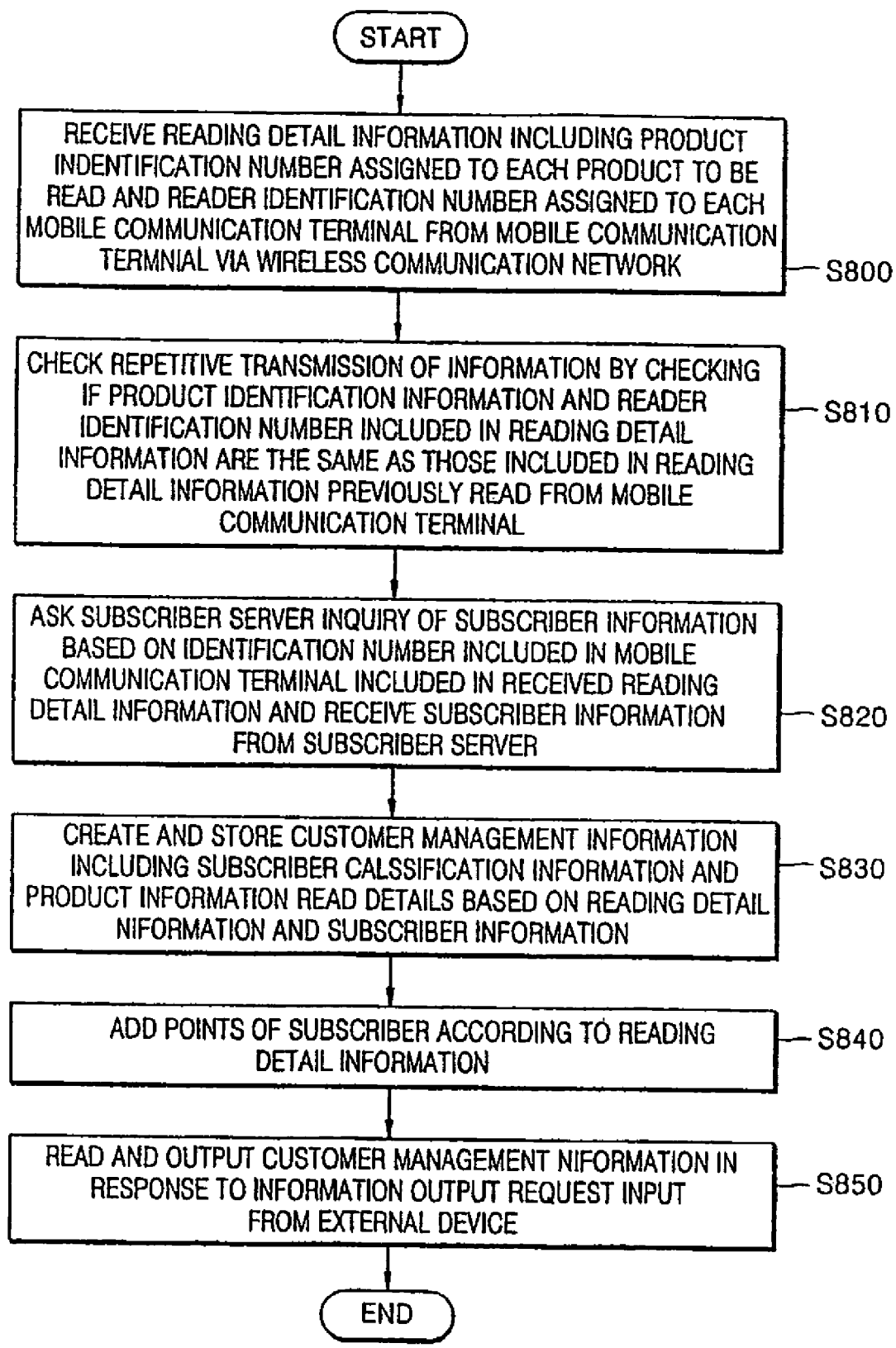
FIG. 8 is a flowchart illustrating a method of providing genuine product authentication service according to a preferred embodiment of the present invention.

FIG. 8 is a flowchart illustrating a method of providing genuine product authentication service according to a preferred embodiment of the present invention.

Referring to FIG. 8, the service management service 40 receives reading detail information including a product identification number assigned to each product to be read from the mobile communication terminals 20-1 and 20-2 and a reader identification number assigned to each of the mobile communication terminals 20-1 and 20-2 via a wireless communication network, in step S800. The service management server 40 checks repetitive transmission of information by checking if the product identification number and the reader identification number that are included in the reading detail information that is selectively read are the same as those included in reading detail information that is previously read from the mobile communication terminals 20-1 and 20-2, in step S810. The service management server 40 asks the subscriber server 30 inquiry of subscriber information based on the identification number included in the mobile communication terminals 20-1 and 20-2 included in the received reading detail information and receives the subscriber information from the subscriber server 30, in step S820. Next, the service management server 40 creates and stores customer management information including subscriber classification information and product information read details based on the reading detail information and the subscriber information, in step S830. The subscriber classification information includes at least one of age, area, sex distinction, and job of a subscriber, and the reading detail information includes at least one of a type of industry, a manufacturer, a brand, a grade, a model name, a producing center, date and time of manufacture, a product serial number, a product price, and a time of authentication. Also, the reading detail information may further include purchasing information including a purchasing price and date and time of purchasing concerning a product that has been already purchased. Next, the service management server 40 adds points of the subscriber according to the reading detail information in step S840. The service management server 40 reads and outputs customer management information in response to an information output request input from an external device, in step S850.

The present invention can be implemented as computer readable codes in computer readable recording media. The computer readable recording media include all kinds of recording apparatuses in which data that can be read by a computer system is stored. Such computer readable recording media are ROM, RAM, CD-ROM, magnetic tape, floppy disk, and optical data storage, and carrier wave (e.g., transmissions via the Internet). The computer readable recording media can be distributed in a computer system connected to a network, and can be stored and operated in forms of computer readable codes.

According to the present invention, using a small-sized and thin mobile communication terminal, it is possible to apply genuine product authentication to wide-range of products, including not only products that need genuine product authentication at the time of purchasing, such as clothing, footwear, leather products, liquor, products & livestock goods, drugs & medications, electronics, and machinery, but also products that need continuous and long-term genuine product authentication, such as jewellery and art works, appraisal reports, admission tickets, certificates and tickets for the use of facilities, money, marketable securities, and important documents.

Also, by using a mobile communication terminal having a tag read function according to the present invention, purchasers can easily and conveniently check the genuineness of a product any time any where and distributors cannot attempt to deceive purchasers to sell a counterfeit product because the distributors cannot know when the purchasers will perform genuine product authentication. Also, if the mobile communication terminal is distributed to consumers in large quantities, distribution and purchasing tendencies of consumers or distributors can be largely reduced. Also, since the mobile communication terminal displays product information as plaintexts, purchasers can directly and easily check a result of genuine product authentication with higher reliability.

Also, according to the mobile communication terminal according to the present invention, since genuine product authentication depends on effectiveness of an encryption key and contents displayed on a portable terminal depend on determination by the naked eye, it is not necessary to additionally access to a network or to previously estimate and store a large amount of data. In addition, even in the case of the same encryption key, a product can be distinguished by displayed contents. Thus, if the same encryption key is applied to a new product that is distributed or other kinds of products, the genuineness of a product can be performed without a need to upgrade the tag reader. Also, according to the tag and the mobile communication terminal according to the present invention, it is possible to secure numerous encryption keys using limited memory by including an encryption key creation module that can numerous encryption keys or storing a plurality of encryption keys. Even after the mobile communication terminal is already obtained, it is possible to incorporate more numerous types of industry, brands or products in the subject of genuine product authentication by assigning new encryption keys the incorporated products. Also, even when an encryption key of a type of industry, a brand, or a product is leaked out, encryption keys for the remaining types of industry, brands, or products are different, thus security can be maintained. If an encryption key is leaked out, it is possible to more sufficiently prevent use of a counterfeit reader with respect to an additionally released product by assigning a new encryption key to the additionally released product. Thus, the present invention has an advantage over prior art that can use a tag reader for a new product by upgrading already distributed numerous tag readers.

Also, according to the present invention, by limiting the number of reading, it is possible to prevent reuse of a tag without damaging the tag. Also, it is possible to prevent tags that should not be reused from being used for a counterfeit product with higher reliability in comparison to physical methods. Also, by performing a memory refresh procedure every time of reading, it is possible to overcome a limit to a term of preservation of data in electric memory for a product that should be held for a long period of time, such as antiques or art works, and widen a range of applicable products. Also, according to the present invention, it is possible to block hacking a genuine product authentication message and attempting to copy an authentication system by coping with replay attack and enhance reliability of genuine product authentication. Also, according to the present invention, if an encryption key is leaked out, the mobile communication terminal is upgraded in offline through a newly distributed tag. Thus, in a position of users, the reader is upgraded without any manipulation and damage caused by the advent of counterfeit products can be minimized. Also, according to the present invention, since mutual authentication between mobile communication terminals can be performed, it is possible to prevent use of counterfeit portable tag readers that operate with respect to counterfeit contactless communication tags.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile communication terminal that receives information received from a contactless communication tag, the mobile communication terminal comprising:
    a communication unit, which wirelessly exchanges data with the contactless communication tag which is a physical device attached to a product and separated from the mobile communication terminal;
    a storing unit in which encryption keys information related to at least two encryption keys are stored;
    a decryption unit, which receives encryption key specifying information from the contactless communication tag, selects corresponding encryption key related information from said encryption keys information related to at least two encryption keys according to the encryption key specifying information, and decrypts data received from the contactless communication tag based on the selected encryption key related information;
    an information reading unit, which requests product information of the product from the contactless communication tag and reads the product information received from the contactless communication tag; and
    an output unit, which outputs the read product information, wherein the decryption unit decrypts the product information received from the contactless communication tag, and the output unit displays or sounds the decrypted product information.

2. The mobile communication terminal of claim 1, further comprising a leaked encryption key updating unit that upon receipt of encryption key update request information concerning a leaked encryption key from the contactless communication tag, discards an encryption key designated by the encryption key update request information from the storing unit and updates with a newly assigned encryption key.

3. The mobile communication terminal of claim 1, wherein the encryption key related information includes a plurality of encryption keys that is classified and assigned according to a classification reference including at least one of a type of industry, a manufacturer, a brand, and a product name; and
    the decryption unit decrypts the product information received from the contactless communication tag using an encryption key selected from the plurality of encryption keys based on the encryption key specifying information received from the contactless communication tag.

4. The mobile communication terminal of claim 1, wherein the encryption key related information includes at least one seed value for creation of different encryption keys; and
    the decryption unit decrypts the product information received from the contactless communication tag using an encryption key using a seed value selected based on the encryption key specifying information received from the contactless communication tag.

5. The mobile communication terminal of claim 4, further comprising a leaked seed value updating unit that, upon receipt of seed value update request information concerning a leaked seed value from the contactless communication tag, removes a seed value designated by the seed value update request information from the storing unit and updates with a newly assigned seed value.

6. The mobile communication terminal of claim 1, wherein the encryption key related information includes a plurality of seed values that is classified and assigned according to a classification reference including at least one of a type of industry, a manufacturer, a brand, and a product name; and
    the decryption unit decrypts the product information received from the contactless communication tag using an encryption key created based on a seed value selected from the plurality of seed values based on the encryption key specifying information received from the contactless communication tag.

7. The mobile communication terminal of claim 1, further comprising a leaked encryption key updating unit that, upon receipt of update request information concerning leaked encryption key related information from the contactless communication tag, removes encryption key related information designated by the update request information from the storing unit and updates with newly assigned encryption related information.

8. The mobile communication terminal of claim 1, further comprising a replay attack blocking unit which generates a one-time use random number, adds the one-time use random number to information to be transmitted to the tag reader, provides the information to the decryption unit, and checks if a random number extracted from information received from the tag reader is the same as the one-time use random number, thereby blocking replay attack.

9. The mobile communication terminal of claim 1, wherein the storing unit includes non-volatile memory, and further comprising a refresh processing unit that reads the product information from the storing unit and re-records the read product information on the storing unit.

10. The mobile communication terminal of claim 1, wherein a radio frequency (RF) circuit, the information reading unit, the decryption unit, and the storing unit of the communication unit are implemented as application specific integrated circuit (ASIC).

11. The mobile communication terminal of claim 1, wherein the information reading unit specifies a plurality of product information from a type of industry, a manufacturer, a brand, and a product name based on the encryption key specifying information received from the contactless communication tag and provides the specified plurality of product information to the output unit, and the output unit outputs the specified plurality of product information.

12. The mobile communication terminal of claim 1, further comprising a reader authentication unit that authenticates an external mobile communication terminal having a tag read function by communicating with the external mobile communication terminal having the tag read function and outputs a result of authentication concerning the external mobile communication terminal having the tag read function to the output unit.

13. The mobile communication terminal of claim 1, further comprising an encryption unit that encrypts data to be transmitted to the contactless communication tag based on encryption key related information selected from the encryption key related information by encryption key specifying information received from the contactless communication tag.

14. The mobile communication terminal of claim 1, wherein if a purchasing confirm command is input through an information input means, purchasing information of a product relating to the product information is transmitted to a service management server together with the decrypted product information.

15. The mobile communication terminal of claim 1, wherein the decrypted product information is stored in the storing unit every time the product information is received and decrypted; and the decrypted product information stored in the storing unit to is transmitted to a service management server if an information transmission command is input through an information input means.

16. The mobile communication terminal of claim 1, wherein the contactless communication tag the contactless communication tag is a thin film type passive tag.

* * * * *

UNITED STATES PATENT AND TRADEMARK OFFICE
CERTIFICATE OF CORRECTION

PATENT NO. : 7,606,557 B2
APPLICATION NO. : 10/551344
DATED : October 20, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 592 days.

Signed and Sealed this

Twelfth Day of October, 2010

David J. Kappos
*Director of the United States Patent and Trademark Office*